United States Patent
Nagai et al.

(10) Patent No.: US 7,063,911 B1
(45) Date of Patent: Jun. 20, 2006

(54) GASKET FOR FUEL CELL AND METHOD OF FORMING IT

(75) Inventors: Osamu Nagai, Fujisawa (JP); Shigeo Wakamatsu, Fujisawa (JP); Yuichi Kuroki, Fujisawa (JP)

(73) Assignee: NOK Corporation, Tokyo (JP)

( * ) Notice: Subject to any disclaimer, the term of this patent is extended or adjusted under 35 U.S.C. 154(b) by 430 days.

(21) Appl. No.: 10/030,076

(22) PCT Filed: Jun. 14, 2000

(86) PCT No.: PCT/JP00/03853

§ 371 (c)(1),
(2), (4) Date: Jan. 10, 2002

(87) PCT Pub. No.: WO01/04983

PCT Pub. Date: Jan. 18, 2001

(30) Foreign Application Priority Data

| Jul. 13, 1999 | (JP) | 11-198413 |
| Oct. 15, 1999 | (JP) | 11-293988 |
| Oct. 29, 1999 | (JP) | 11-308424 |
| Dec. 7, 1999 | (JP) | 11-347120 |

(51) Int. Cl.
  *H01M 8/02* (2006.01)
  *F16J 15/16* (2006.01)
(52) U.S. Cl. ............. 429/35; 429/30; 429/34; 429/36
(58) Field of Classification Search ........... 429/35, 429/30, 36, 34
See application file for complete search history.

(56) References Cited

U.S. PATENT DOCUMENTS

| 5,684,110 | A | * | 11/1997 | Kawamura ............... 528/15 |
| 5,686,032 | A | * | 11/1997 | Mizobe et al. ........... 264/40.3 |
| 5,985,480 | A | * | 11/1999 | Sato et al. .............. 429/65 |
| 6,051,097 | A | * | 4/2000 | Higuchi et al. .......... 156/329 |
| 6,057,405 | A | * | 5/2000 | Wengrovius et al. ..... 525/477 |
| 6,080,503 | A | * | 6/2000 | Schmid et al. ........... 429/35 |
| 6,316,139 | B1 | * | 11/2001 | Uchida et al. ........... 429/36 |
| 6,337,120 | B1 | * | 1/2002 | Sasaki et al. ........... 428/66.4 |
| 6,660,422 | B1 | * | 12/2003 | Krasij et al. ........... 429/35 |

FOREIGN PATENT DOCUMENTS

| EP | 0671575 A2 | 9/1995 |
| JP | 57-125746 | 8/1982 |
| JP | 58-155670 | 9/1983 |
| JP | 7-65847 | 3/1995 |
| JP | 7-153480 | 6/1995 |
| JP | 7-226220 | 8/1995 |
| JP | 7-312223 | 11/1995 |
| JP | 8-37012 | 2/1996 |
| JP | 9-231987 | 9/1997 |
| JP | 2000-77084 | 3/2000 |

* cited by examiner

Primary Examiner—Hoa Van Le
(74) Attorney, Agent, or Firm—Jacobson Holman PLLC

(57) ABSTRACT

In a gasket used for a fuel battery, in order to solve problems with respect to making a seal portion thin, improving an assembling property, preventing a position shift, making a surface pressure low, making the surface pressure uniform, and the like, a gasket lip made of a liquid rubber hardened material is integrally formed on a surface of a flat plate made of a carbon, a graphite, a conductive resin such as a conductive phenol resin or the like, an ion exchange resin, or a metal such as a stainless steel, a magnesium alloy or the like, or on a groove portion applied to the surface.

7 Claims, 24 Drawing Sheets

Fig. 23

|  | Injection molding pressure | Mold clamping pressure | Injection molding pressure | Mold clamping pressure |
|---|---|---|---|---|
|  | 30MPa | 1.8ton | 10MPa | 1.8ton |
| Comparative embodiment | Crack generated || Good result ||
| Embodiment | Good result || Good result ||

GASKET FOR FUEL CELL AND METHOD OF FORMING IT

This is a nationalization of PCT/JP00/03853, filed Jun. 14, 2000, and published in Japanese.

TECHNICAL FIELD

The present invention relates to a gasket for a fuel battery and a method of forming the same.

BACKGROUND ART

For example, as shown in FIG. 24, a fuel battery has flat plates such as collector electrodes (separators) 2, an ion exchange membrane 3 held between them, membrane fixing reaction electrodes 4 fixed to the ion exchange membrane 3 and the like, and these constituting elements are combined, whereby a fuel battery cell 1 is constituted. As a material of the flat plates, a graphite or the like is employed in addition to a carbon, and further, a conductive resin such as a conductive phenol, an ion exchange resin, a metal such as a stainless steel, a magnesium alloy or the like, and the like may be employed.

With respect to a seal for the fuel battery cell 1 and a seal between the respective constituting elements, since a lot of seals are used for laminating a lot of cells 1, it is possible to make a product itself compact by using a seal material which is as thin or narrow as possible.

Further, there have been conventionally known a structure using a single gasket (refer to Japanese Unexamined Patent Publication No. 9-231987, 7-226220 or 7-153480), a structure in which a foamed sponge layer 6 is overlapped on a rubber plate 5 as illustrated so as to utilize as a gasket (refer to Japanese Unexamined Patent Publication No. 7-312223) and the like, however, these prior arts do not correspond to a structure intending to achieve objects of making the seal portion thin, improving an assembling property, preventing a position shift, making a surface pressure low, making the surface pressure uniform and the like, that is, these conventional separated type gasket has a disadvantage which can not sufficiently satisfy the points of making the seal portion thin, improving the assembling property, preventing the position shift, making the surface pressure low, making the surface pressure uniform and the like, and further, there is a risk that a problem in an assembling process, a malfunction due to a mis-assembling, a functional unstableness or the like is generated.

That is, in the case of a normal separated type gasket, although the low surface pressure, the uniform surface pressure and the like can be achieved, it has been impossible to simultaneously satisfy the thinness of seal, the position shift prevention at a time of assembling and the like.

Further, in the case of forming the gasket in accordance with the known forming method, a weld defect is easily generated in a terminal end portion of a material flow passage, so that it is hard to form a lip in the portion in correspondence to a shape of a metal mold, and this becomes the worst reason for obstructing a sealing performance.

Accordingly, in order to prevent the problems mentioned above, a vacuum forming is generally executed, and, in the conventional vacuum forming methods, there are a method of executing an evacuation by providing an evacuation passage in the middle of a material flow passage, and a method of executing an evacuation by surrounding a whole of a metal mold by a vacuum chamber.

However, in the former method, since there is a case that a low viscosity material corresponding to a forming material for a gasket flows in the evacuating passage, there is a problem that a stable formation of the gasket is obstructed. Further, in the latter method, there is a problem that a structure of the metal mold portion is necessarily complex and expensive, and further, there is a problem that an evacuating capacity becomes too much so as to give a bad influence to a cycle time.

The present invention is made by taking the points mentioned above into consideration, and an object of the present invention is to provide a gasket used for a fuel battery which can solve the problems with respect to making a seal portion thin, improving an assembling property, preventing a position shift, making a surface pressure low, making the surface pressure uniform, and the like, and a method of forming such the gasket, and another object of the present invention is to provide a method of forming a gasket which can stably form the gasket, has a comparatively simple structure of a metal mold apparatus and has a comparatively short cycle time.

DISCLOSURE OF THE INVENTION

In order to achieve the object mentioned above, a gasket for a fuel battery in accordance with the present invention is characterized in that a gasket lip made of a liquid rubber hardened material is integrally formed in a surface of a flat plate made of a carbon, a graphite, a conductive resin such as a conductive phenol resin or the like, an ion exchange resin, or a metal such as a stainless steel, a magnesium alloy or the like, or a groove portion applied to the surface, and in correspondence thereto, in accordance with a first aspect of the present invention, there is provided a gasket for a fuel battery characterized in that a gasket lip made of a liquid rubber hardened material is integrally formed in a surface of a flat plate or a groove portion applied to the surface.

Further, in accordance with a second aspect of the present invention, there is provided a gasket for a fuel battery as recited in the first aspect mentioned above, characterized in that the flat plate is a collector electrode, an ion exchange membrane or a membrane fixing reaction electrode.

Further, in accordance with a third aspect of the present invention, there is provided a gasket for a fuel battery as recited in the first aspect mentioned above, characterized in that the liquid rubber hardened material has a hardness of (JIS A) 60 or less.

Further, in accordance with a fourth aspect of the present invention, there is provided a gasket for a fuel battery as recited in the third aspect mentioned above, characterized in that the hardness (JIS A) of the liquid rubber hardened material is preferably between 5 and 50 and more preferably between 10 and 40.

Further, in accordance with a fifth aspect of the present invention, there is provided a gasket for a fuel battery as recited in the first aspect mentioned above, characterized in that a viscosity (Pa·s(25 degrees Celsius)) of the liquid rubber is between 30 and 10,000 and preferably between 30 and 2,000.

Further, in accordance with a sixth aspect of the present invention, there is provided a gasket for a fuel battery as recited in the first aspect mentioned above, characterized in that a cross sectional shape of the gasket lip made of the liquid rubber hardened material is a trapezoidal shape or a chevron shape.

Further, in accordance with a seventh aspect of the present invention, there is provided a gasket for a fuel battery as recited in the first aspect mentioned above, characterized in that a cross sectional shape of the gasket made of the liquid rubber hardened material is provided with a portion having a trapezoidal cross section or a portion having a chevron cross section.

Further, in accordance with an eighth aspect of the present invention, there is provided a gasket for a fuel battery as recited in the first aspect mentioned above, characterized in that a seal portion of the gasket lip has a circular arc cross sectional shape.

Further, in accordance with a ninth aspect of the present invention, there is provided a gasket for a fuel battery as recited in the eighth aspect mentioned above, characterized in that the seal portion has a height of substantially 0.2 to 1.5 mm.

Further, in accordance with a tenth aspect of the present invention, there is provided a gasket for a fuel battery as recited in the first aspect mentioned above, characterized in that the seal portion of the gasket lip has a chevron cross sectional shape, a convex cross sectional shape or a triangular cross sectional shape.

Further, in accordance with an eleventh aspect of the present invention, there is provided a gasket for a fuel battery as recited in the tenth aspect mentioned above, characterized in that the seal portion has a height of substantially 0.3 to 1.5 mm.

Further, in accordance with a twelfth aspect of the present invention, there is provided a gasket for a fuel battery as recited in the tenth aspect mentioned above, characterized in that a front end portion of the seal portion has a circular arc cross sectional shape.

Further, in accordance with a thirteenth aspect of the present invention, there is provided a gasket for a fuel battery, characterized in that gasket lips made of a liquid rubber hardened material are integrally formed on a surface of an electrode or a groove portion applied on the surface, a pair of the gasket lips arranged so as to hold an electrolyte membrane portion between them are formed so as to have different cross sectional shapes, and a flat surface portion provided with a predetermined width being in contact with the electrolyte membrane portion is formed in one of the gasket lips.

Further, in accordance with a fourteenth aspect of the present invention, there is provided a gasket for a fuel battery, characterized in that gasket lips made of a liquid rubber hardened material are integrally formed on a surface of an electrode or a groove portion applied on the surface, a flat surface portion provided with a predetermined width being in contact with an electrolyte membrane potion is formed in at least one of a pair of the gasket lips arranged so as to hold the electrolyte membrane portion between them.

Further, in accordance with a fifteenth aspect of the present invention, there is provided a gasket for a fuel battery, characterized in that gasket lips made of a liquid rubber hardened material are integrally formed on a surface of an electrode or a groove portion applied on the surface, and a flat surface portion provided with a predetermined width being in contact with an ion exchange membrane is formed in at least one of a pair of gasket lips arranged so as to hold the ion exchange membrane between them.

Further, in accordance with a sixteenth aspect of the present invention, there is provided a gasket for a fuel battery as recited in the first aspect mentioned above, characterized in that a projection along a gasket lip line is provided in the flat surface plate, and the gasket lip is formed so as to cover the projection.

Further, in accordance with a seventeenth aspect of the present invention, there is provided a gasket for a fuel battery as recited in the first aspect mentioned above, characterized in that a projection along a gasket lip line is provided in the flat surface plate, an adhesive agent is applied around the projection, and the gasket lip is formed so as to cover the area.

Further, in accordance with an eighteenth aspect of the present invention, there is provided a gasket for a fuel battery as recited in the first aspect mentioned above, characterized in that a projection along a gasket lip line is provided in the flat surface plate, an adhesive agent is not applied around the projection, and the gasket lip is formed so as to cover the area.

Further, in accordance with a nineteenth aspect of the present invention, there is provided a method of forming a gasket for a fuel battery as recited in any one of the first aspect to the eighteenth aspect mentioned above, characterized in that a gap is provided between upper and lower molds before injecting so as to evacuate, and thereafter the molds are clamped so as to injection mold the gasket lip.

Further, in accordance with a twentieth aspect of the present invention, there is provided a method of forming a gasket for a fuel battery as recited in the nineteenth aspect mentioned above, characterized in that a through hole open to both surfaces of the flat plate or bottom surfaces of groove portions applied to the both surfaces is provided, and the gasket lip is integrally formed in the both surfaces or both groove portions through the through hole simultaneously.

Further, in accordance with a twenty first aspect of the present invention, there is provided a gasket for a fuel battery, characterized in that a pair of groove portions are provided so as to respectively correspond to both surfaces of a substrate, a communication hole is provided in the substrate so as to communicate a pair of groove portions, an elastomer is charged into a pair of groove portions and the communication hole, a convex seal lip is provided in the elastomer, the communication hole is arranged at a position biasing to one side in a width direction of the groove portion, and the convex seal lip is arranged at a position biasing to an opposite side.

Further, in accordance with a twenty second aspect of the present invention, there is provided a method of forming a gasket for a fuel battery integrally provided with a seal lip constituted by an elastomer on both surfaces of a substrate, characterized in that a communication hole communicating between seal lip forming cavities formed between metal molds engaged and aligned with both surfaces of the substrate is provided in the substrate, the communication hole is formed at a position corresponding to a gate open to one of the both seal lip forming cavities with a larger diameter than that of the gate, and a forming material supplied from the gate is charged into the both seal lip forming cavities via the communication hole.

The gasket for the fuel battery in accordance with the first aspect of the present invention provided with the structure mentioned above is structured, in order to solve the problems in the conventional art, such that the gasket lip made of the liquid rubber hardened material corresponding to the low viscosity material is integrally formed on the surface of the flat plate constituted by the collector electrode, the ion exchange membrane, the membrane fixing reaction membrane (refer to the second aspect) or the like, whereby it is intended to make the seal portion thin, improve an assembling property, prevent a position shift, reduce a surface pressure and make the surface pressure uniform. Further, in the case that the gasket lip made of the liquid rubber hardened material corresponding to the low viscosity material is integrally formed in the groove portion applied to the surface of the flat plate, since the gasket lip is integrally formed not only on the bottom surface of the groove portion but also on the side surface, it is possible to further improve a fixing property. The liquid rubber hardened material is employed for the forming material of the gasket lip as mentioned above, and it is preferable that the hardness (JIS A) of the liquid rubber hardened material is set to be 60 or less, preferably between 5 and 50 and more preferably between 10 and 40 (refer to the third and fourth aspects). Further, in the fuel battery in which the flat plates are laminated via a multiplicity of gaskets, by using the low hardness rubber, it is possible to seal with a low fastening pressure, it is possible to prevent the flat plate from being damaged, and it is possible to absorb an unevenness on an opposing surface to the gasket. The low viscosity material preferably employs a viscosity between 30 and 10,000 Pa·s (25 degrees Celsius), preferably between 30 and 2,000 Pa·s (25 degrees Celsius), and for example, it is possible to use a silicon rubber, a fluorine-contained rubber, a nitrile rubber, an ethylene propylene rubber or the like respectively in a liquid phase. Further, since it is possible to increase a fluidity of the rubber so as to reduce an injection pressure by employing the low viscosity material as mentioned above, it is possible to reduce a damage and a deformation of the flat plate due to a forming pressure at a time of injection molding (refer to the fifth aspect).

Further, as in the gasket for the fuel battery in accordance with the thirteenth aspect of the present invention, when a pair of gasket lips are formed so as to have different shapes and the flat surface portion is provided in one of them, the flat portion forms a receiving side among a pair of seal portions constituted by a pair of gasket lips and a area of the receiving side is set to be comparatively wide by a width of the flat portion, so that it is possible to enlarge an allowable range of position shift from a medium value with respect to a closely contact position of another gasket lip. A combination of the gasket lip preferably employs a combination between a trapezoidal cross section corresponding to the receiving side and a chevron cross section in an opposite side, and preferably employs a combination between a cross sectional shape provided with a trapezoidal cross sectional portion and a cross sectional shape provided with a chevron cross sectional portion.

Further, it is preferable that the seal portion of the gasket lip has a circular arc cross sectional shape, and the seal portion in this case preferably has a height of substantially 0.2 to 1.5 mm. Further, it is preferable that the seal portion of the gasket lip has a chevron cross sectional shape, a convex cross sectional shape or a triangular cross sectional shape, it is preferable that a height of the seal portion in this case is between substantially 0.3 and 1.5 mm, and it is further preferable that a front end portion of the seal portion is formed in a circular arc cross sectional shape.

Further, as in the gasket for the fuel battery in accordance with the fourteenth aspect or the fifteenth aspect of the present invention, when the flat portion is formed in at least one of a pair of gasket lips arranged so as to hold the electrolyte membrane portion or the ion exchange membrane between them, it is also possible to enlarge the allowable range of position shift in the same manner and it is possible to stabilize the contact of the gasket lip.

Further, in the case of forming the gasket lip by using the liquid rubber hardened material as mentioned above, a liquid injection molding apparatus is used as a molding apparatus, and at a time of injection molding the gasket lip by using the liquid injection molding apparatus, the metal mold is held so that a gap equal to or less than 2 mm is kept between the upper and lower metal molds immediately before the injection, and a portion between the upper and lower metal molds is sealed by using a seal member such as an O-ring or the like (refer to S101, in FIG. 3. Same Fig. will be referred hereunder). Next, a nozzle touch is executed and a material inflow port is closed so as to form a sealed space shut out from an ambient air within the metal mold (S102). Next, an evacuation is executed via evacuation holes provided at one or a plurality of portions on a metal mold parting surface, and in order to prevent the material from being sucked from the nozzle and flowing into a cavity at this time, a shut-off valve is provided in the nozzle so as to prevent the material from flowing in (S103). Next, a mold clamping is completely executed at a stage that it is judged that the evacuation reaches a desired degree of vacuum (S104), the material is injected within the cavity in which the degree of vacuum is maintained (S105), and the gasket lip is formed (the nineteenth aspect).

The method of forming the gasket for the fuel battery in accordance with the nineteenth aspect mentioned above is structured such that the gasket lip made of the liquid rubber hardened material corresponding to the low viscosity material is integrally formed on one surface or both surfaces of the flat plate, however, when it is trieed to form the gasket lip one side by one side in the case that it becomes necessary to provide the gasket lip on both surfaces of the thin plate, there is a case that an opposite side becomes in a floating state and cracks due to the molding pressure or a burr is generated due to deflection. Further, it is possible to consider a method of providing a convex portion in a lower mold so as to support a groove portion on a back surface, however, it is necessary to manufacture another mold in the case that the groove shape is different between front and back surfaces, whereby it is impossible to avoid a cost increase and a mold structure becomes very complex. Taking into consideration the matter that the height fluctuates on the basis of a metal mold working tolerance and a plate groove depth tolerance, there is a case that it is hard to maintain a stable molding. Accordingly, in the forming method in accordance with the twentieth aspect of the present invention, the structure is made such that the through hole open to both surfaces of the flat plate is provided, and the gasket lips are integrally formed on both surfaces of the flat plate via the through hole simultaneously, or the through hole open to the bottom surfaces of the groove portions applied to both surfaces of the flat plate is provided, and the gasket lips are integrally formed in both groove portions via the through hole simultaneously.

Further, the gasket for the fuel battery in accordance with the sixteenth aspect of the present invention is structured as follows.

That is, the gasket for the fuel battery in accordance with the first aspect mentioned above is structured such that the gasket lip is directly formed on the flat plate, and, for the purpose of preventing a lateral shift, the larger bottom width than the lip width is provided, the adhesion treatment is applied or the groove portion is formed on the flat plate and the gasket is formed so as to cover it. However, in the case that the larger bottom width mentioned above is provided, it inevitably accompany the incurrence of a waste of the material and the space. Further, with respect to the holding operation by the adhesive agent, an influence that the adhesive agent gives to a power generating efficiency is not clear at present, and taking into consideration a risk of a bad influence applied due to a long time use, a gasket which can satisfy a performance without the adhesion treatment is desired. Further, in the case of forming the groove portion for preventing the lateral shift on the flat plate and forming the gasket lip so as to cover it, a strength of the plate is reduced thereby, and the contact pressure at a time of assembling is reduced in correspondence to a depth of the groove portion, so that it is necessary to form the gasket lip having a larger size in consideration thereof, whereby a greater strain is applied to the gasket at a time of assembling and there is a risk that a durability is reduced. Accordingly, in the gasket for the fuel battery in accordance with the sixteenth aspect of the present invention, the structure is made such that the projection is provided along the lip line of the flat plate and the projection is covered by the gasket lip, whereby it is possible to prevent the position shift, it is possible to secure the seal surface pressure with a low strain amount and it is possible to secure a durability. Further, as in the gasket in accordance with the seventeenth aspect, the structure can be made such that the adhesive agent is applied as occasion demands, and the gasket lip is formed so as to cover it. It is not always necessary to apply the adhesive agent (refer to the eighteenth aspect). The projection is preferably formed in a triangular cross sectional shape or a trapezoidal cross sectional shape of which a gap between the projection and the opposing member is secured to be equal to or more than 0.2 mm at a time of being assembled, and it is preferable that the projection is covered by the gasket lip having a thickness of 1.0 mm or less.

BRIEF DESCRIPTION OF THE DRAWINGS

FIG. 23 is a table showing a result of comparative test of the manufacturing method.

BEST MODE FOR CARRYING OUT THE INVENTION

Next, a description will be given of embodiments in accordance with the present invention with reference to the accompanying drawings.

FIRST EMBODIMENT

Figure 1:
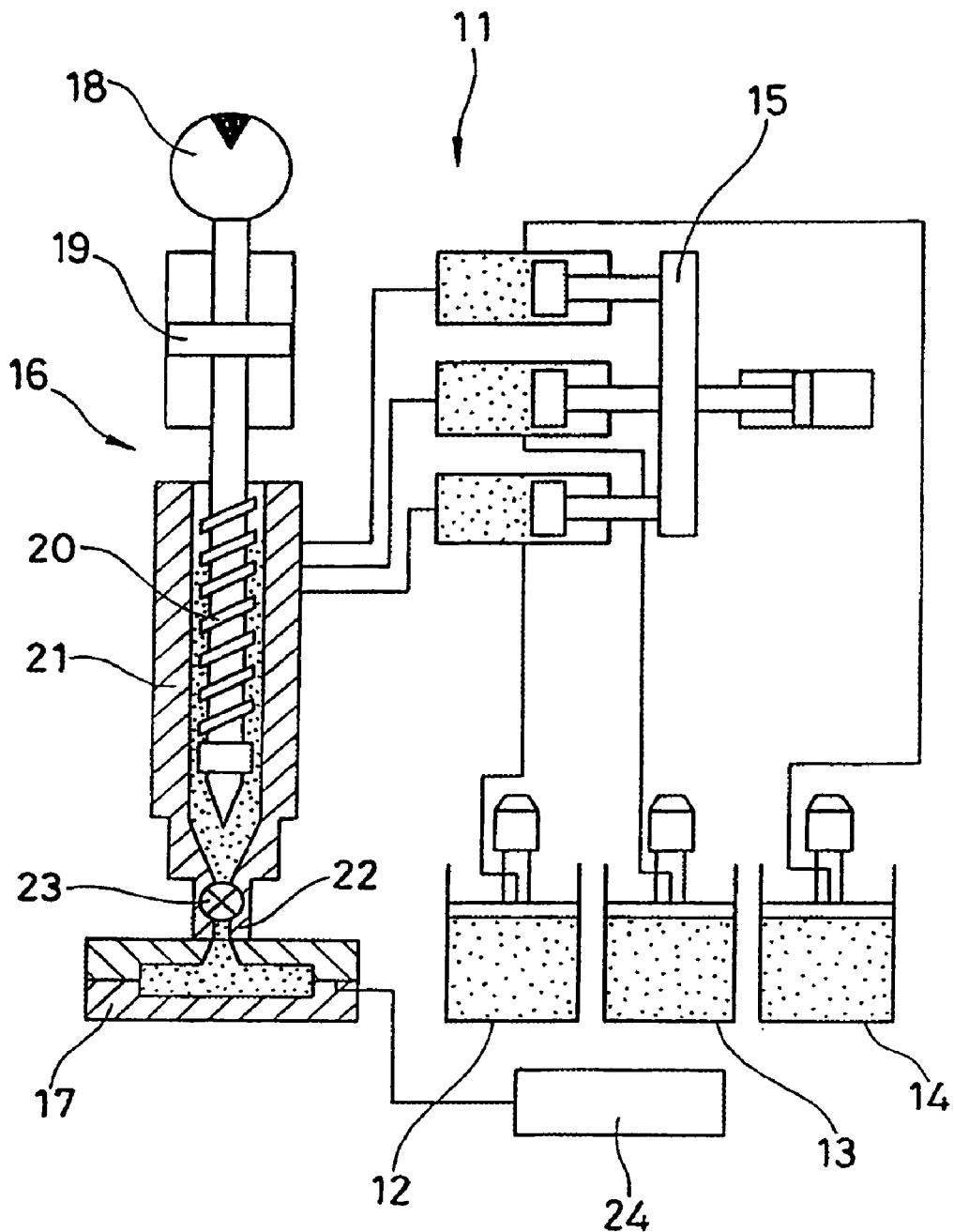
FIG. 1 is a schematic view of a liquid injection molding apparatus used for executing a method of forming a gasket in accordance with a first embodiment of the present invention.

FIG. 1 shows a liquid injection molding apparatus 11 used for executing a method of forming a gasket in accordance with a first embodiment of the present invention. A gasket (also refer to a gasket lip or a gasket main body) is formed by injecting a molding material supplied from a base resin tank 12, a coloring agent tank 13 and a setting agent tank 14 to an injection apparatus 16 via a material supplying plunger 15, into a metal mold 17 from the injection apparatus 16. The injection apparatus 16 is provided with a screw 20 driven in accordance with an operation of a hydraulic motor 18 and an injection cylinder 19, and an injection cylinder 21 within which the screw 20 is inserted, and a shut-off valve 23 preventing an inflow of the molding material is arranged within a nozzle 22 at a front end of the injection cylinder 21 so as to be freely opened and closed. Further, an evacuation apparatus 24 constituted by a vacuum pump is connected to the metal mold 17.

Figure 2:
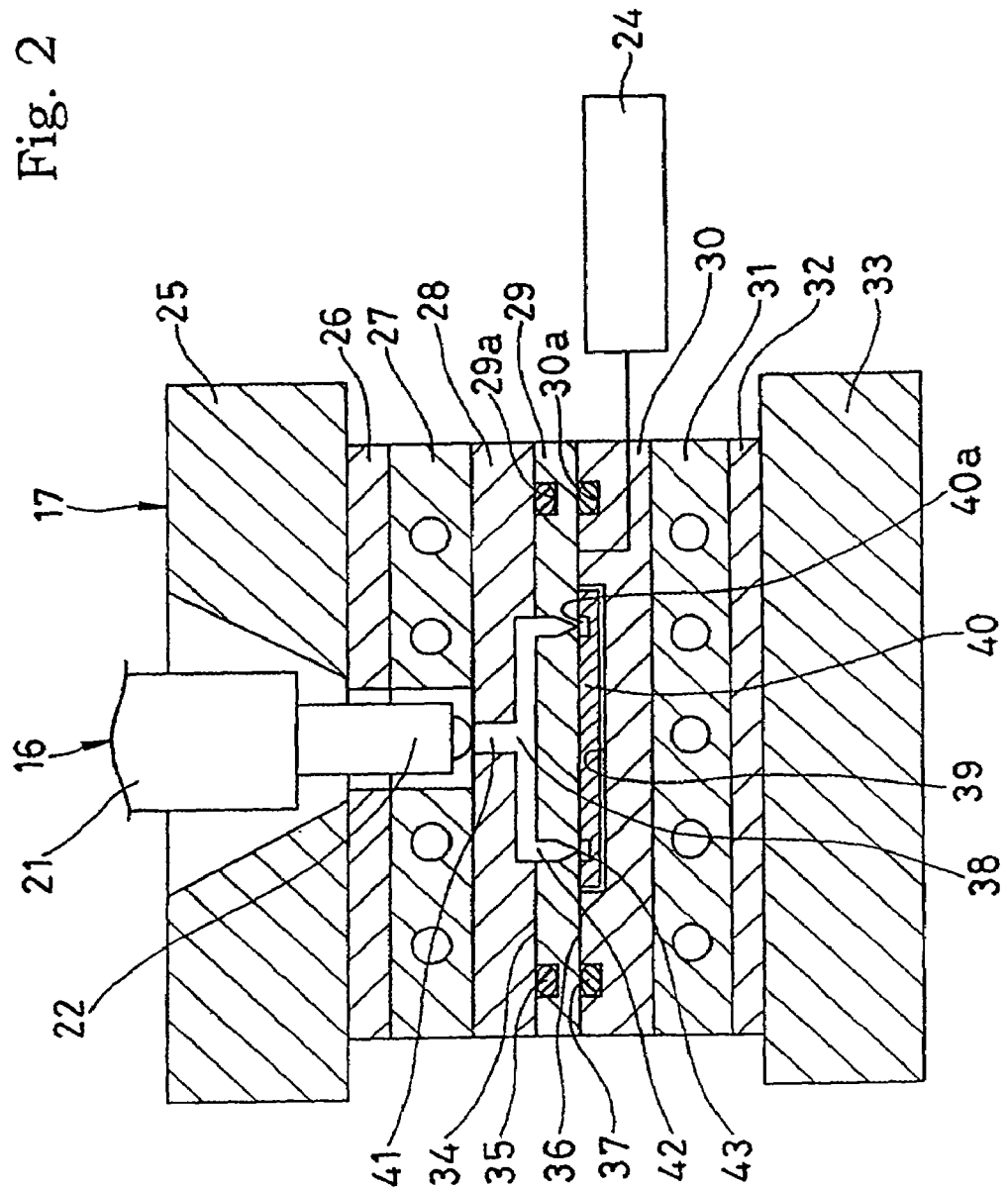
FIG. 2 is a detailed schematic view of a metal mold in the apparatus.

FIG. 2 shows details of the metal mold 17. An upper platen 25, a heat insulating plate 26, an upper heating plate 27, an upper mold 28, a middle mold 29, a lower mold 30, a lower heating plate 31, a heat insulating plate 32 and a lower platen 33 are laminated in this order. A parting surface 34 of the upper mold 28 and the middle mold 29 is sealed by an O-ring 35 attached to an attaching groove 29a on an upper surface of the middle mold 29, a parting surface 36 of the middle mold 29 and the lower mold 30 is sealed by an O-ring 37 attached to an attaching groove 30a on an upper surface of the lower mold 30, and a sealed space 38 sealed by the O-rings 35 and 37 is evacuated by the evacuation apparatus 24. Further, a cavity space 39 is provided on an upper surface of the lower mold 30, a molding material is charged within a groove portion (also referred as a working groove) 40a or a recess portion formed on an upper surface (one surface) of a flat plate porous carbon member (also referred as a plate or a flat plate) 40 previously placed in the cavity space 39 from the injection apparatus 16 via a spool 41, a runner 42 and a gate 43, whereby a gasket (also referred as a gasket lip) is formed, and the gasket is integrally formed with the carbon member 40 at the same time of molding. The carbon member 40 is particularly constituted by the collector electrodes (separators) 2 of the fuel battery, the ion exchange membranes 3 held between them, the membrane fixing reaction electrode 4 fixed to the ion exchange membranes 3, or the like as mentioned above, and a graphite or the like may be employed for the material thereof in addition to the carbon. In this case, the groove portion 40a aims to strengthen a adhesive force of the gasket and prevent the position shift, and is not always required in the case that an adhesive property between the carbon member 40 and the gasket can be secured, and in the case that there is no risk that the position shift is generated due to an internal pressure at a using time.

Figure 3:
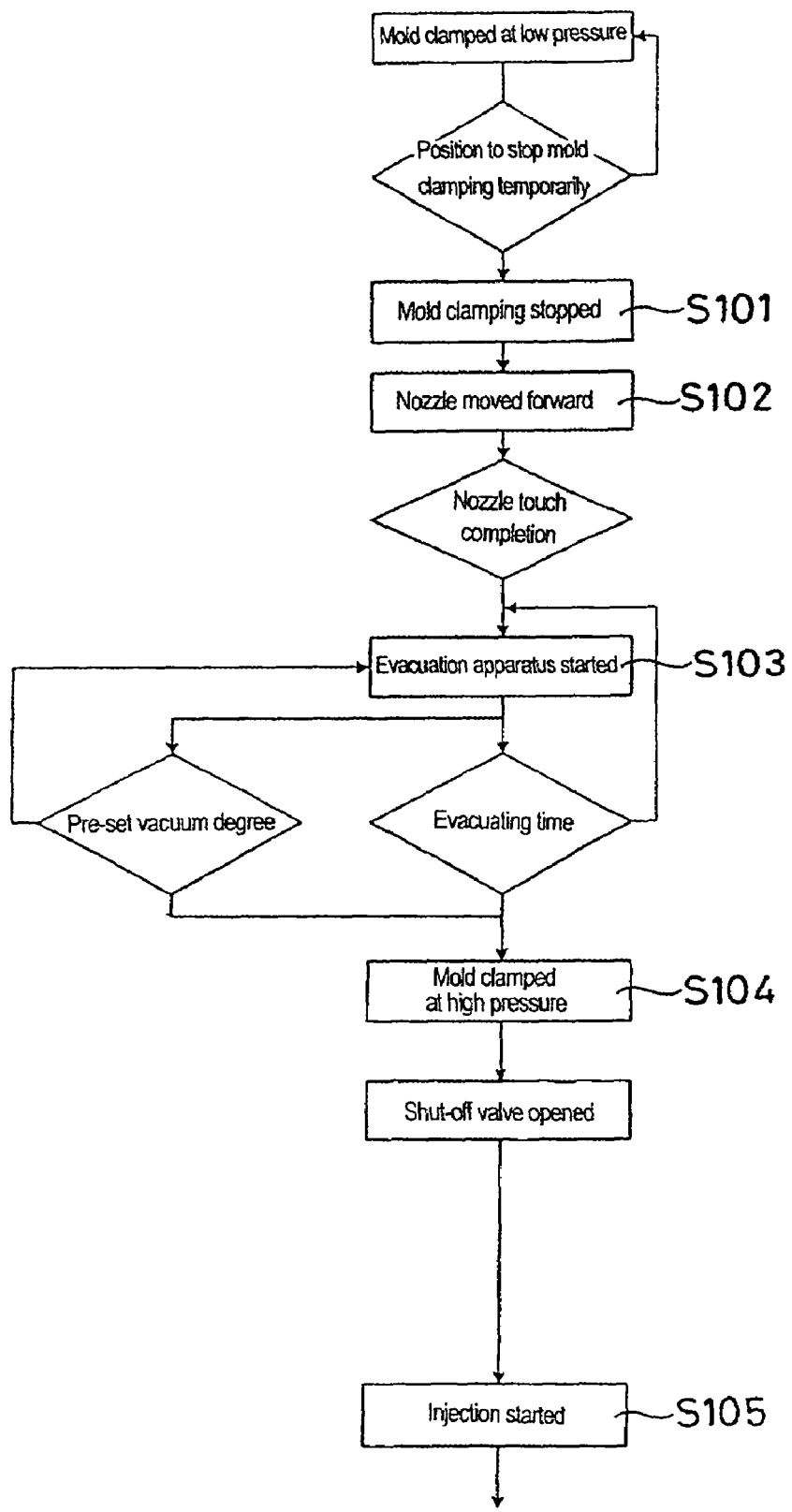
FIG. 3 is a control flow chart of the apparatus.

FIG. 3 shows a control flow for an injection molding. In a mold clamping process, at first, a mold clamping is temporarily stopped at a previously set position (S101). During the temporary stop of the mold clamping, a distance between the metal molds is kept constant by using a holding means of a mold clamping position, and the distances between the molds are set so that the O-ring 35 held by the middle mold 29 and the O-ring 37 held by the lower mold 30 are in contact with the upper mold 28 and the middle mold 29 respectively while the middle and upper molds 29, 28 and the lower and middle molds 30, 29 have not been completely closed yet and have intervals within 2 mm respectively, whereby the ambient air does not flow into the sealed space 38 in the next evacuating process. Next, the nozzle 22 is moved forward at a time when the temporary stop of the mold clamping is completed so as to be touched with the upper mold 28 (S102). It is necessary to set a nozzle touch force to a level so that a leakage is not generated during the evacuation within the cavity space 39, however, the nozzle touch force may be generally equal to or more than 2 kN, whereby the other flow passages than the flow passage by which the cavity space 39 is connected to the evacuation apparatus 24 are completely shut down from the ambient air.

After the nozzle touch force is increased and a limit switch is operated, or at a stage that a predetermined time has elapsed from a time when the nozzle 22 starts moving forward, the evacuation apparatus 24 is operated so as to start evacuating (S103). In this case, a shut-off valve is provided within the nozzle 22 and the shut-off valve is closed, so as to prevent the material from being sucked from the nozzle 22 at an evacuating time so as to flow into the cavity 39.

Then, a mold clamping is executed by a high pressure at a time of reaching a previously set elapsed time (for example, 15 seconds or less) after starting the evacuation (S104) or a previously set degree of vacuum (for example, 10 Torr or less). The high mold clamping pressure at this time is equal to or less than a compression rupture strength of the carbon material 40 or less, and is desirably set to a pressure at which the carbon material 40 does not rupture and no burr is generated even in the case that the charging pressure is applied. For example, with respect to a structure in which a groove 40a (having a width 3.0 mm and a depth 0.3 mm) is worked on a surface of a carbon material (IKC-33 manufactured by TOYO CARBON) 40 of a resin impregnation type cut so as to have a shape and a thickness (2 mm) suitable for the separator for the fuel battery, it is desirable to restrict to be equal to or less than 10 kgf/mm².

Further, a liquid rubber hardened material in which a viscosity before hardening is 150 Pa·s (25 degrees Celsius) and a hardness (JIS A) after hardening is 20 for example, a liquid silicon rubber KE1950-20 (A·B) manufactured by SHINETSU CHEMICAL is good for the molding material, and the hardened material is obtained by controlling the temperature to a temperature at which the hardening is not progressed within the injection cylinder 21, that is, a temperature equal to or less than 25 degrees Celsius in the embodiment, and injecting to the metal mold a temperature of which is controlled to a hardening temperature 120 degrees Celsium to 180 degrees Celsius capable of obtaining a desired hardened material, 150 degrees Celsius in the embodiment. The injection pressure at this time is 200 kgf/cm², in the embodiment, and the hardening time is 150 seconds.

Further, since the gasket formed in the manner mentioned above corresponds to a structure obtained by integrally forming the gasket made of the low viscosity material with the groove portion 40a formed on the surface of the flat plate porous carbon member 40 such as the collector electrode 2, the ion exchange membrane 3, the membrane fixing reaction membrane 4 or the like, it is possible to realize making the seal portion thin, improving the assembling property, preventing the position shift, reducing the surface pressure and making the surface pressure uniform which are the conventional problems, and further it is possible to realize reducing a number of the parts, preventing the position shift under a pressurizing condition during a use after assembling, stabilizing a size accuracy of the product, reducing an assembling problem, preventing an malfunction unstableness due to a mis-assembling, reducing a defective molding, stably molding the gasket, improving a sealing property, simplifying a metal mold structure, reducing a molding process, reducing an adhesive treatment process, reducing a cost, reducing a cycle time, reducing a burr leakage and the like.

SECOND EMBODIMENT

Figure 4:
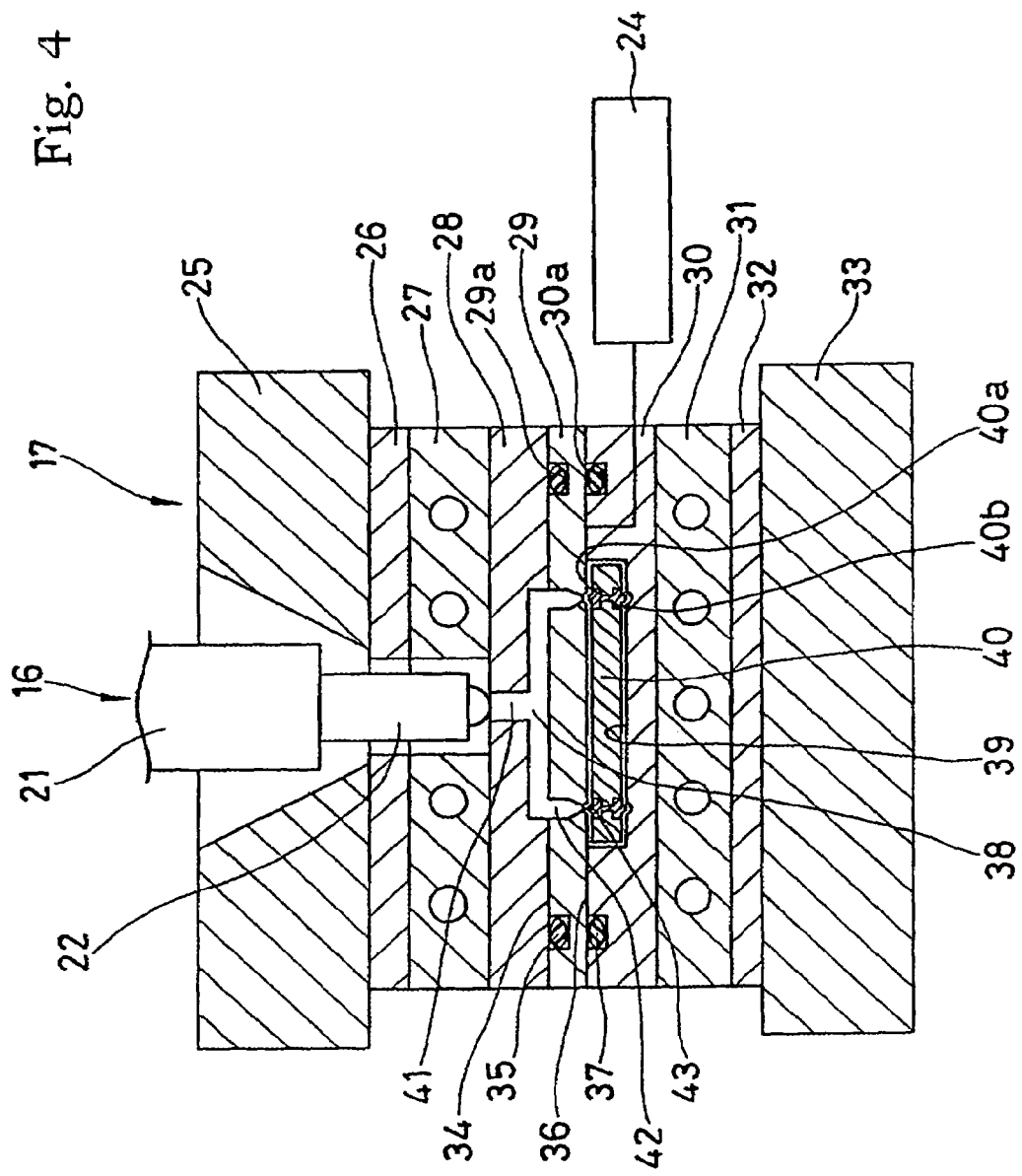
FIG. 4 is a schematic view of a liquid injection molding apparatus used for executing a method of forming a gasket in accordance with a second embodiment of the present invention.
Figure 5:
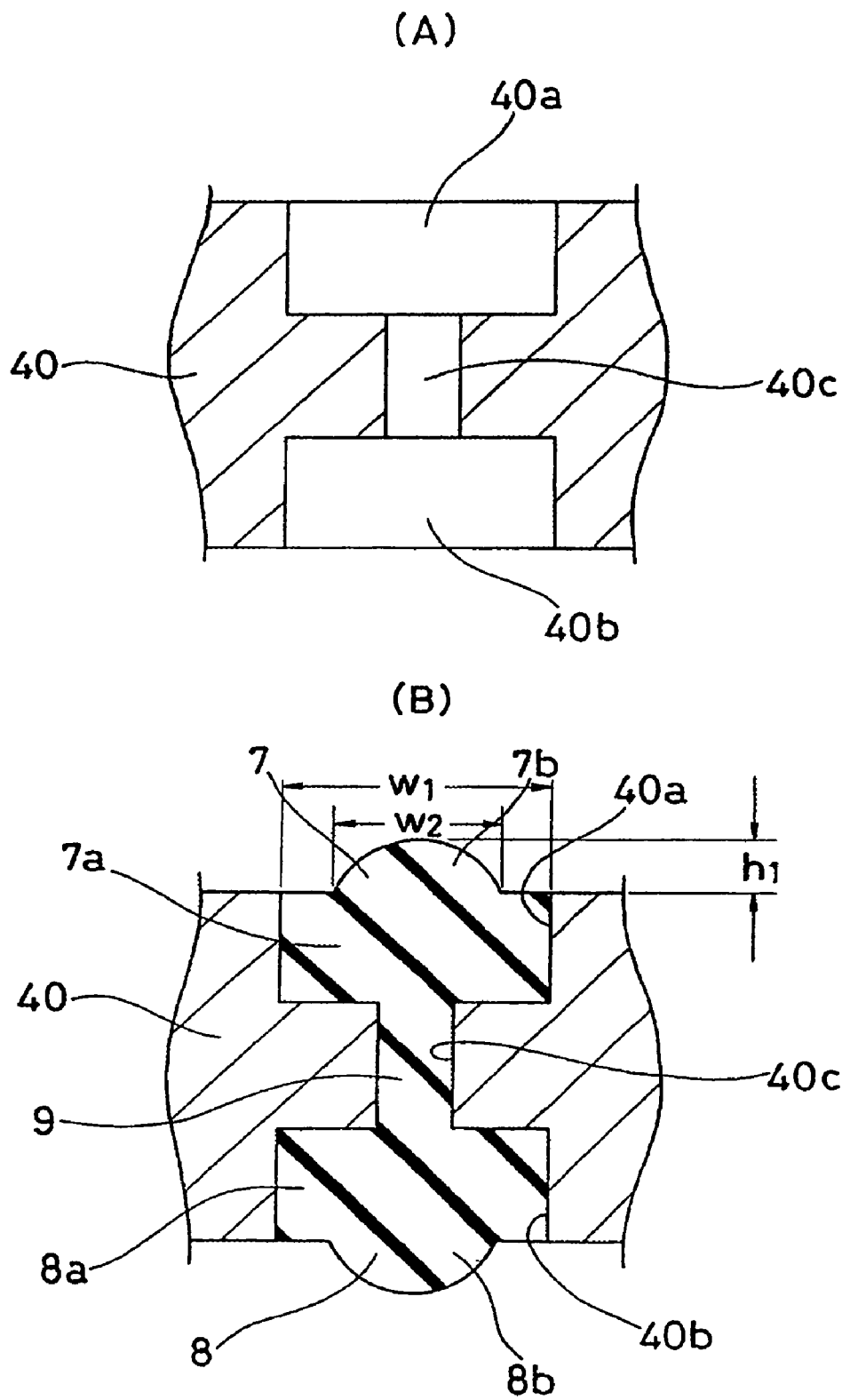
FIG. 5A is a cross sectional view of a main portion of a porous member showing a state before forming the gasket.
FIG. 5B is a cross sectional view of a main portion of a porous member showing a state after forming the gasket.

In a second embodiment in accordance with the present invention shown in FIG. 4, groove portions 40a and 40b are formed so as to correspond to each other on an upper surface and a lower surface of a flat surface plate porous carbon member 40 previously placed in a cavity space 39, and as shown in FIG. 5A in an enlarged manner, the groove portions 40a and 40b are communicated with each other via a through hole (also referred as a communication hole) 40c open to a bottom surface of each of the groove portions 40a and 40b. The through hole 40 is structured, for example, a plurality of through holes having a diameter of 1 mm are formed at an interval between 10 and 20 mm.

Accordingly, when the molding material of the gasket is supplied to the carbon member 40, as shown in FIG. 5B, the gaskets 7 and 8 are integrally formed with both of the groove portions 40a and 40b via the through hole 40c simultaneously, whereby it is possible to realize making the seal portion thin, improving the assembling property, preventing the position shift, reducing the surface pressure and making the surface pressure uniform which are conventionally problems, and further it is possible to realize reducing a number of the parts, preventing the position shift under a pressurizing condition during a use after assembling, stabilizing a size accuracy of the product, reducing an assembling problem, preventing an malfunction unstableness due to a misassembling, reducing a defective molding, stably molding the gasket, improving a sealing property, simplifying a metal mold structure, reducing a molding process, directly molding the gasket on both surfaces of the thin plate, reducing an adhesive treatment process, reducing a cost, reducing a cycle time, preventing a plate crack, reducing a burr leakage and the like.

The gaskets 7 and 8 respectively integrally have base portions (charging portions) 7a and 8a having a rectangular cross sectional shape and charged within the groove portions 40a and 40b, and seal parts (seal portions) 7b and 8b having a circular arch cross sectional shape and protruding from the groove portions 40a and 40b so as to be closely contact with an opposing member, and they are integrally formed via a rubber hardened material 9 within the through hole 40c. In the respective gaskets 7 and 8, a width w1 of the base portions 7a and 8a, that is, a width w1 of a whole of the gaskets 7 and 8 is substantially 1.5 to 5 mm at actual size, a width w2 of the seal portions 7b and 7b is substantially 1 to 4 mm at actual size, and a height h1 of the seal portions 7b and 8b is substantially 0.2 to 1.5 mm at actual size, respectively. The other structures and the other operations and effects of the gasket and the forming method thereof in accordance with the present invention are the same as those of the first embodiment mentioned above. Further, the groove portions 40a and 40b may be omitted in the same manner, and in this case, the through hole 40c is directly open on both of the upper and lower surfaces of the carbon member 40.

THIRD EMBODIMENT

Figure 6:
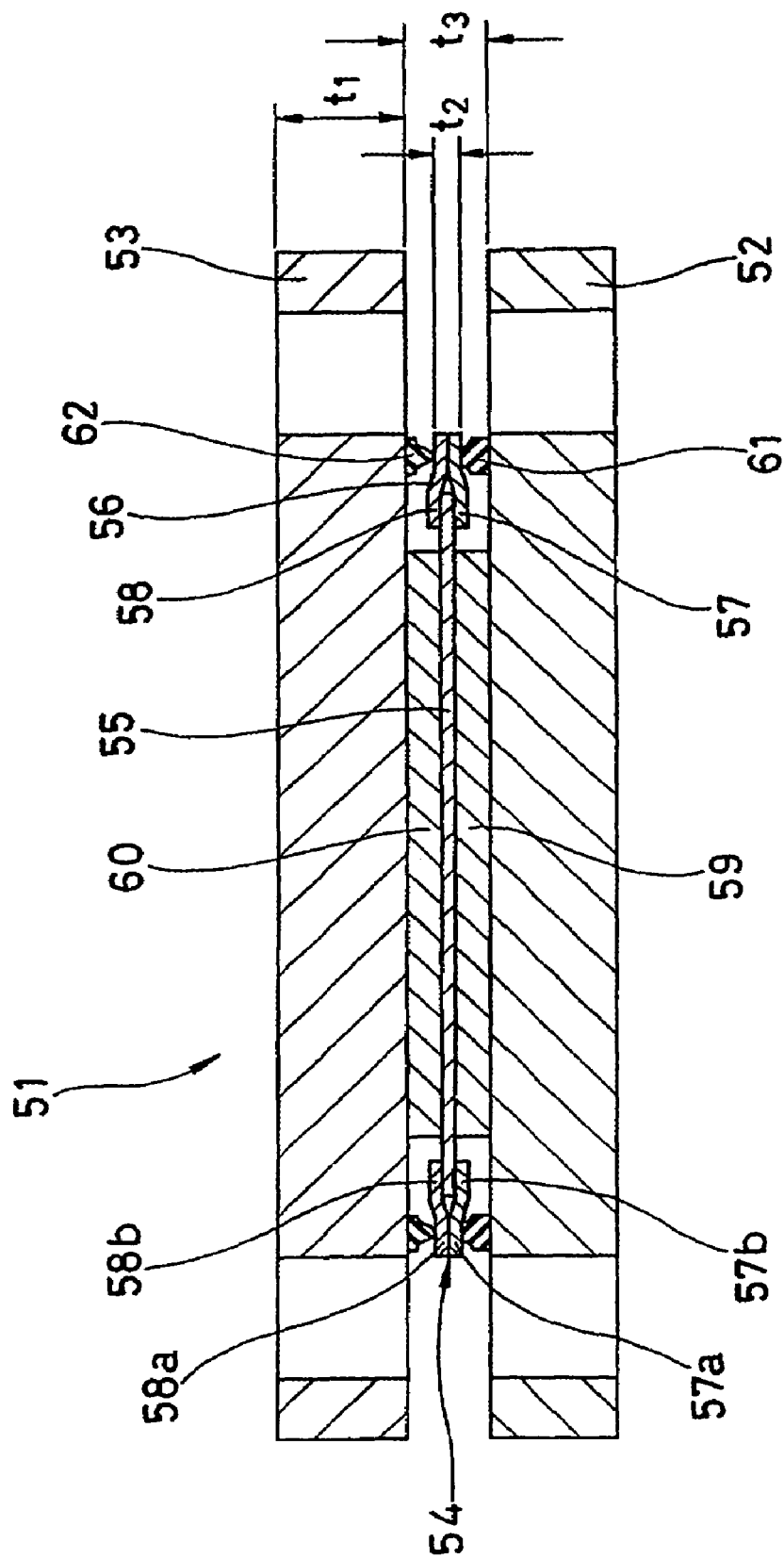
FIG. 6 is a cross sectional view of a gasket in accordance with a third embodiment of the present invention.

Next, FIG. 6 shows a cross section of a gasket for a fuel battery in accordance with a third embodiment of the present invention. This gasket is structure in the following manner.

That is, at first, an electrolyte membrane 55 is arranged between a pair of electrodes (also referred as outer electrodes) 52 and 53, and electrodes (also referred as inner electrodes) 59 and 60 are respectively arranged between the respective electrodes 52 and 53 and the electrolyte membrane 55, whereby a fuel battery cell 51 constituted by a five-layer laminated body made by arranging the electrode 52, the electrode 59, the electrolyte membrane 55, the electrode 60 and the electrode 53 mentioned above in this order is formed.

A pair of electrodes 52 and 53 respectively correspond to the collector electrodes (the separators) mentioned above, are formed by a carbon plate, with a thickness t1 of about 1 to 2 mm at actual size.

The electrolyte membrane 55 corresponds to the ion exchange membrane mentioned above, and is combined with an electrolyte membrane protecting membrane 56 at an end portion in a plane direction, and an electrolyte membrane portion 54 is formed by a combination of the electrolyte membrane 55 and the electrolyte membrane protecting membrane 56. The electrolyte membrane protecting membrane 56 has a pair of constituting parts 57 and 58 gripping the end portion in the plane direction of the electrolyte membrane 55 between them, and a pair of constituting parts 57 and 58 respectively integrally have laminating portions 57a and 58a laminated with each other and gripping portions 57b and 58b gripping the end portion in the plane direction of the electrolyte membrane 55 between them. A thickness t2 of the electrolyte membrane protecting membrane 56 at the laminating portions 57a and 58a of a pair of constituting parts 57 and 58 is about 0.1 to 0.2 mm at actual size.

Further, the electrodes 59 and 60 respectively correspond to the membrane fixing reaction electrodes mentioned above, and are formed by a carbon so as to form a gas flow passage. A thickness t3 of a three-layer laminated body constituted by a pair of electrodes 59 and 60 and the electrolyte membrane 55 is about 0.5 to 1.5 mm at actual size.

Gaskets (also referred as gasket lips or seal members) 61 and 62 made of a low viscosity material are integrally formed on opposing surfaces to each other of a pair of electrodes 52 and 53 so as to correspond to each other, and the electrolyte membrane protecting membrane 56 of the electrolyte membrane portion 54 is held between a pair of gaskets 61 and 62, at the laminated portions 57a and 58a of a pair of constituting parts 57 and 58 in an unbonded manner, whereby the seal portion is formed.

Figure 7:
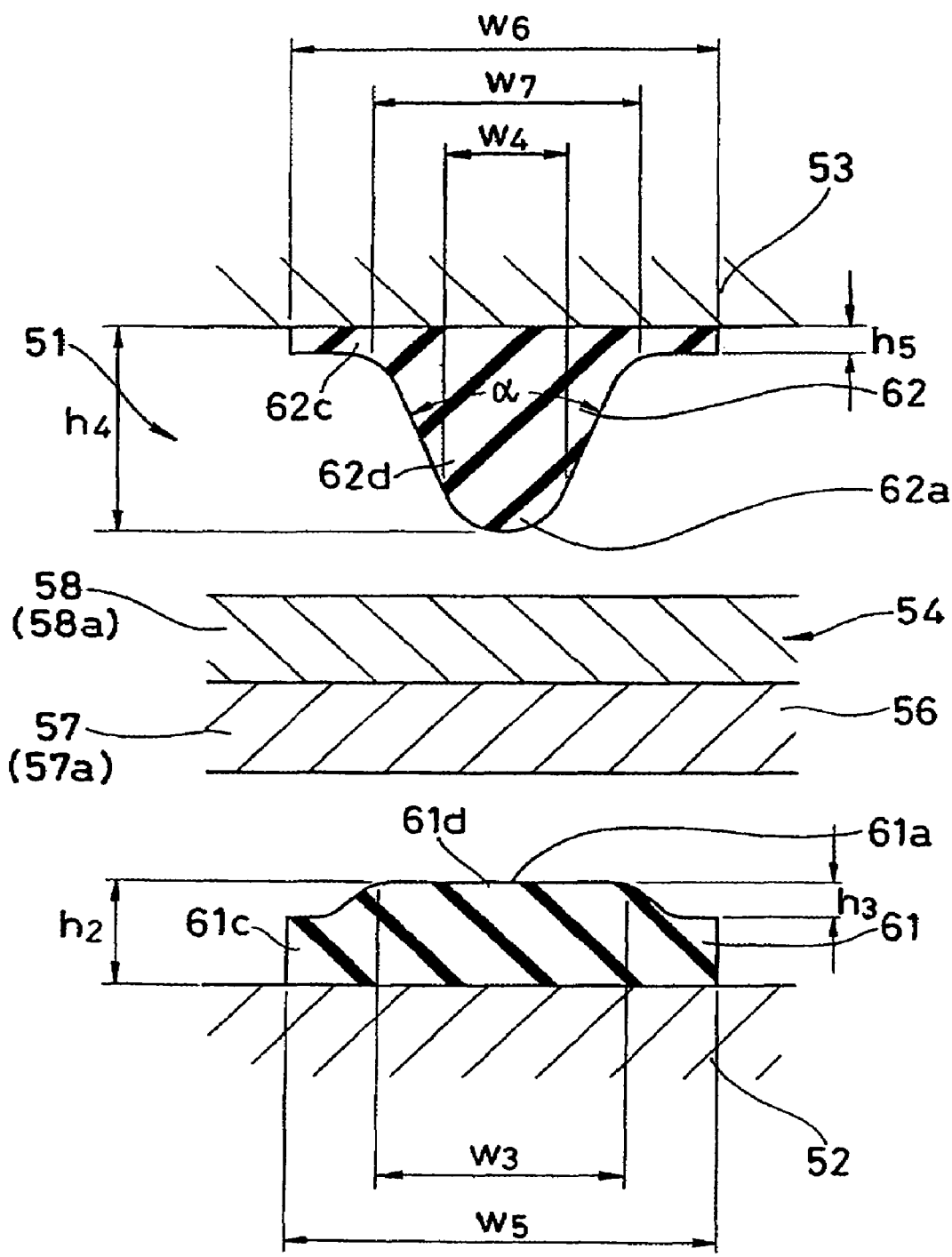
FIG. 7 is an enlarged view of a main portion in FIG. 6.

As shown in FIG. 7 in an enlarged manner, one gasket 61 among a pair of gaskets 61 and 62 is formed as a wholly trapezoidal cross sectional structure by forming a flat surface portion (also referred as a flat portion) 61a at a front end portion thereof, and the plate surface portion 61a is provided with a predetermined width w3. Further, another gasket 62 is formed as a wholly chevron cross sectional structure, a wholly convex cross sectional structure or a wholly triangular cross sectional structure by forming a front end portion 62a in a circular arc cross sectional shape, and is formed so that a width w4 of the front end portion 62a is smaller than the width w3 of the flat surface portion 61a of one gasket 61. One gasket 61 integrally has a rectangular cross sectional base portion 61c and a trapezoidal cross sectional seal portion 61d integrally formed on a flat surface of the base portion 61c, and the flat surface portion 61a is formed in the seal portion 61d. A width w5 of the base portion 61c, that is, a whole width w5 of the gasket 61 is substantially 2 to 5 mm at actual size, the width w3 of the flat surface portion 61a is substantially 1 to 4 mm at actual size, a height h2 of a whole of the gasket 61 is substantially 0.3 to 1 mm at actual size, and a height h3 of the seal portion 61d is substantially 0.1 to 0.5 mm at actual size. Another gasket 62 integrally has a rectangular cross sectional base portion 62c and a chevron cross sectional, a convex cross sectional or a triangular cross sectional seal portion 62d integrally formed on a flat surface of the base portion 62c, and the circular arc cross sectional front end portion 62a is formed in the seal portion 62d. A width w6 of the base portion 62c, that is, a width w6 of a whole of the gasket 62 is substantially 2 to 5 mm at actual size, a width w7 of the seal portion 62d is substantially 1 to 3 mm at actual size, a height h4 of a whole of the gasket 62 is substantially 0.5 to 1.5 mm at actual size, a height h5 of the base portion 62c is substantially 0.2 to 0.5 mm at actual size, and a radius of the circular arc of the front end portion 62a is substantially 0.1 to 0.5 mm at actual size, respectively. Further, a lip front end angle α can be optionally set, however, is preferably about 40 to 130 degrees, and more preferably about 40 to 90 degrees. Further, both of the gaskets 61 and 62 are respectively formed of a silicon rubber having a low hardness.

Since the gasket provided with the structure mentioned above is structured such that the gaskets 61 and 62 made of the silicon rubber corresponding to the liquid rubber hardened material are integrally formed on the surfaces of a pair of electrodes 52 and 53 corresponding to the flat surface plate porous member, and the rubber is integrally formed with the plate at the same time of forming, it is possible to realize making the seal portion thin, improving the assembling property, preventing the position shift, reducing the surface pressure and making the surface pressure uniform which are conventionally problems, and further it is possible to realize reducing a number of the parts, preventing the position shift under a pressurizing condition during a use after assembling, stabilizing a size accuracy of the product, reducing an assembling problem, preventing an malfunction unstableness due to a mis-assembling, reducing a defective molding, stably molding the gasket, improving a sealing property, simplifying a metal mold structure, reducing a molding process, reducing an adhesive treatment process, reducing a cost, reducing a cycle time, reducing a burr leakage and the like.

Further, since the cross sectional shapes of a pair of gaskets 61 and 62 are made different from each other and the flat surface portion 61a is provided in one gasket 61, the flat surface portion 61a forms a receiving side among a pair of seal portions of a pair of gaskets 61 and 62, and a area of the receiving side is set to be comparatively wide by the width w1 of the flat surface portion 61a. Accordingly, it is possible to enlarge an allowable range of the position shift from a medium value with respect to the closely contact position with the opposing member (the electrolyte membrane portion 54) of another gasket 62, whereby it is possible to sufficiently secure a necessary sealing property even when the position shift is rather great.

FOURTH EMBODIMENT

Figure 8:
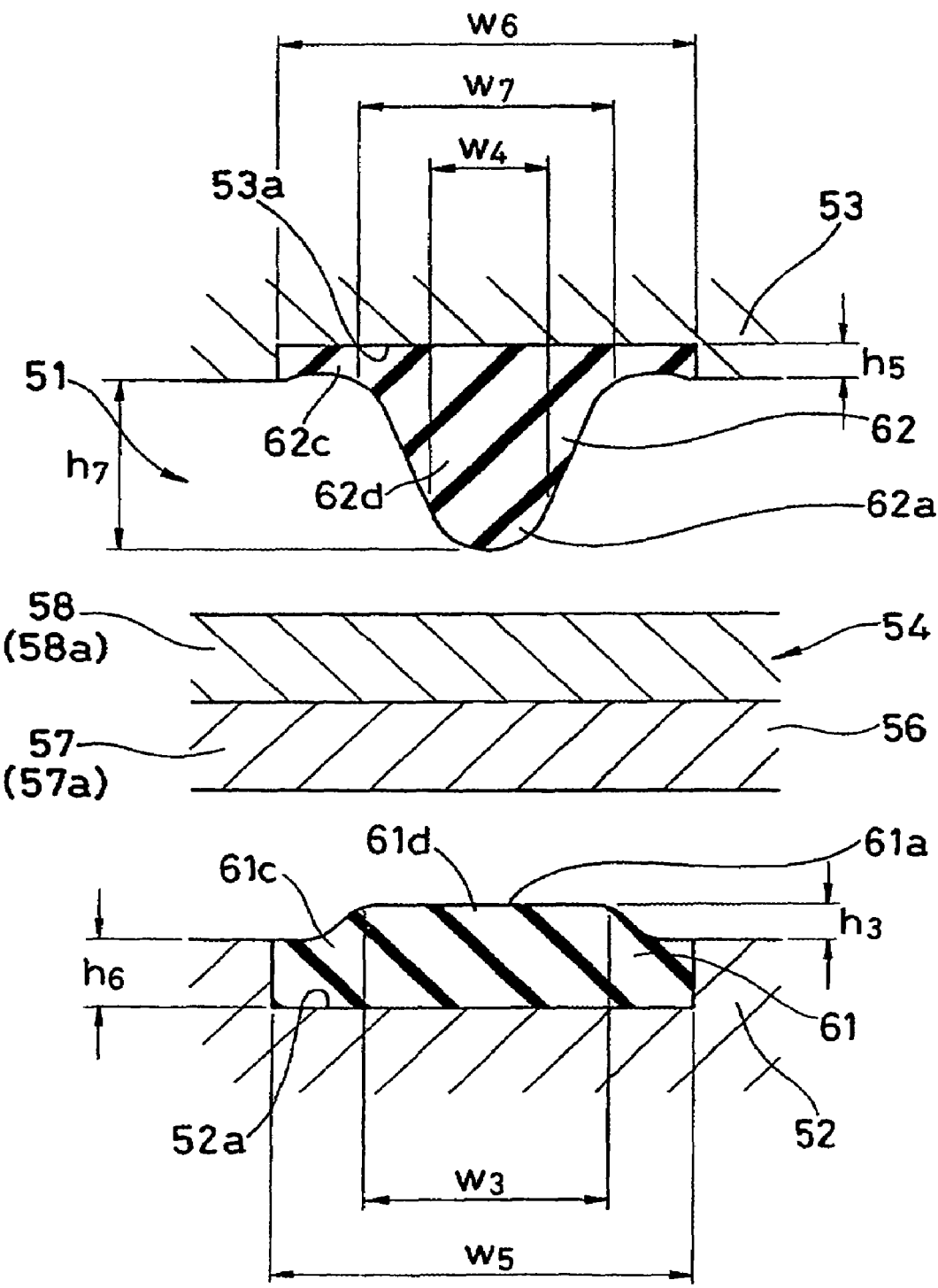
FIG. 8 is a cross sectional view of a main portion of a gasket in accordance with a fourth embodiment of the present invention.

Further, as shown in FIG. 8, the structure may be made such that respective parts of both gaskets 61 and 62 are inserted into groove portions 52a and 53a provided on the surfaces of the electrodes 52 and 53 in addition to the structure mentioned above, and in such the case, it is possible to make a distance between a pair of electrodes 52 and 53 shorter, whereby it is possible to make the laminated body or the fuel battery compact in a thickness direction. Here, in this case, one gasket 61 integrally has a rectangular cross sectional base portion 61c charged in the groove portion 52a and a trapezoidal cross sectional seal portion 61d integrally formed on a flat surface of the base portion 61c, and the flat surface portion 61a is formed in the seal portion 61d. A width w5 of the base portion 61c, that is, a whole width w5 of the gasket 61 is substantially 2 to 5 mm at actual size, the width w3 of the flat surface portion 61a is substantially 1 to 4 mm at actual size, a height h6 of the base portion 61c is substantially 0.1 to 0.5 mm at actual size, and a height h3 of the seal portion 61d is substantially 0.1 to 0.5 mm at actual size. Further, another gasket 62 integrally has a rectangular cross sectional base portion 62c charged in the groove portion 53a, and a chevron cross sectional seal portion 62d integrally formed on a flat surface of the base portion 62c, and the circular arc cross sectional front end portion 62a is formed in the seal portion 62d. A width w6 of the base portion 62c, that is, a width w6 of a whole of the gasket 62 is substantially 2 to 5 mm at actual size, a width w7 of the seal portion 62d is substantially 1 to 3 mm at actual size, a height h5 of the base portion 62c is substantially 0.2 to 0.5 mm at actual size, a height h7 of the seal portion 62d is substantially 0.3 to 1.2 mm at actual size, and a radius of the circular arc of the front end portion 62a is substantially 0.1 to 0.5 mm at actual size, respectively.

FIFTH EMBODIMENT

Figure 9:
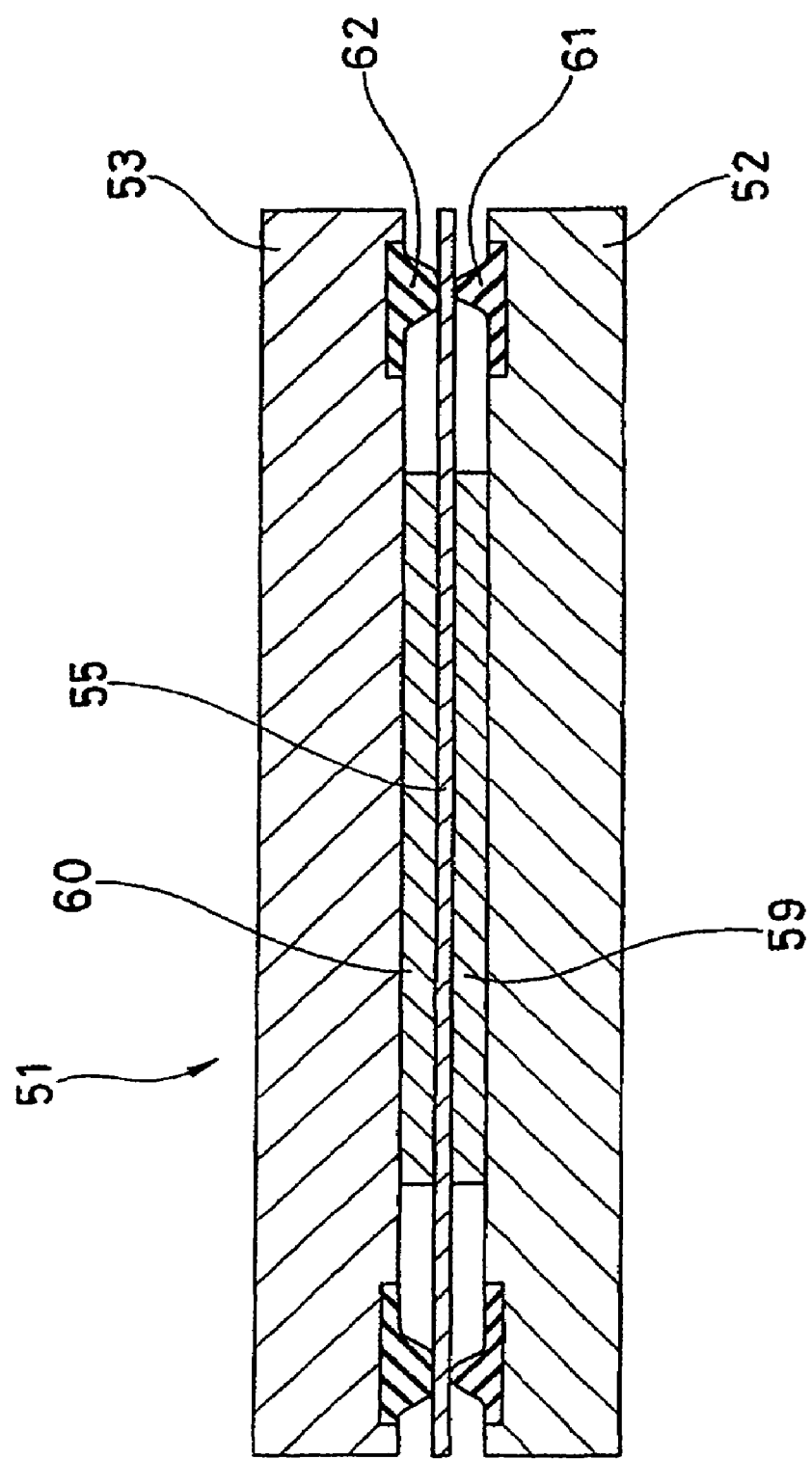
FIG. 9 is a cross sectional view of a gasket in accordance with a fifth embodiment of the present invention.
Figure 10:
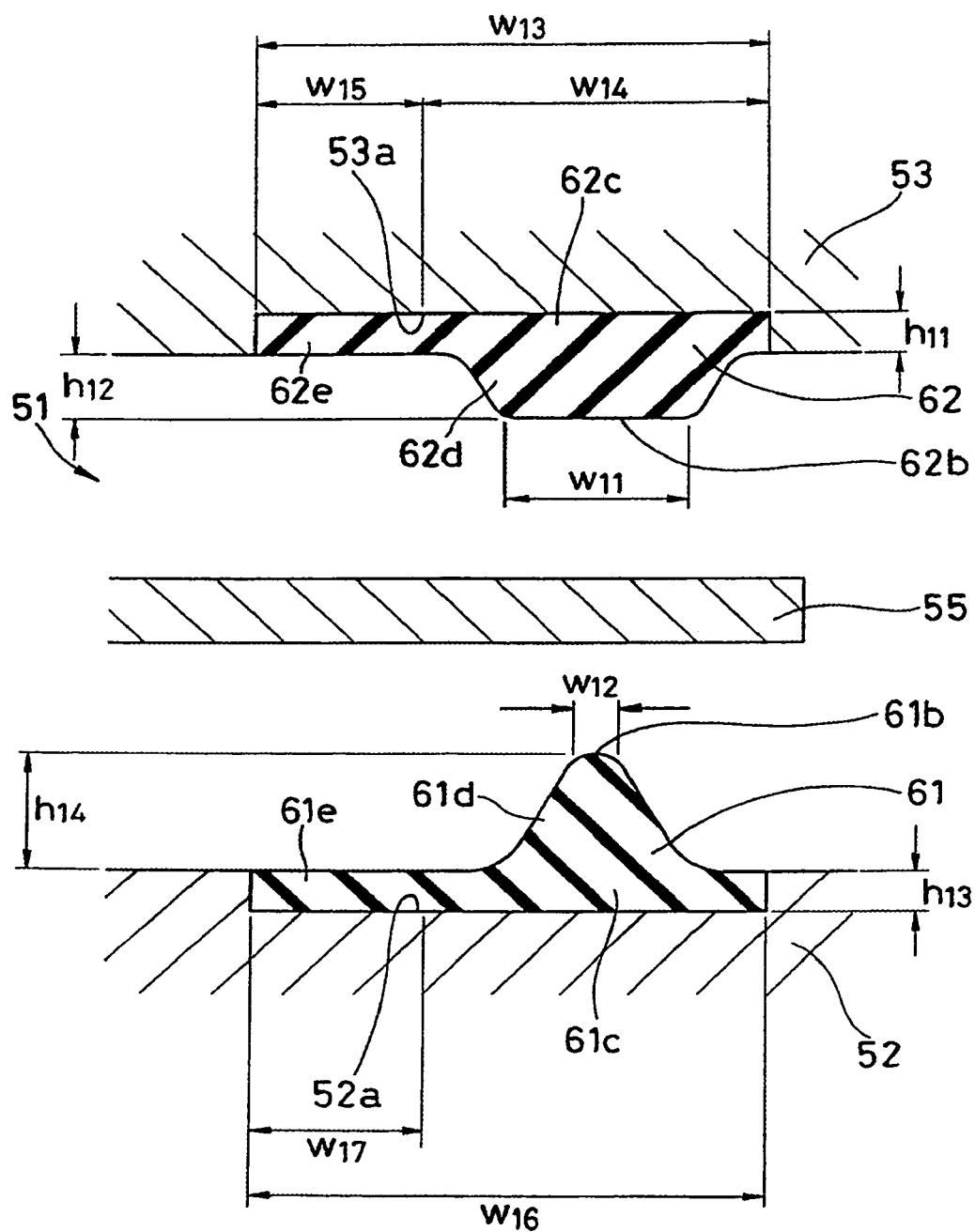
FIG. 10 is an enlarged view of a main portion in FIG. 9.

The gaskets for the fuel battery in accordance with the third and fourth embodiments mentioned above are structured such that the electrolyte membrane portion 54 is held between a pair of gaskets 61 and 62, however, the structure may be made such that the electrolyte membrane 55 itself, that is, the ion exchange membrane 55 itself is held between a pair of gaskets 61 and 62, and this embodiment is shown as a fifth embodiment in FIGS. 9 and 10.

That is, a gasket for a fuel battery shown in FIGS. 9 and 10 is structured as follows.

That is, at first, the ion exchange membrane 55 corresponding to the electrolyte membrane 55 in the third and fourth embodiments is arranged between a pair of electrodes (also referred as outer electrodes) 52 and 53, and electrodes (also referred as inner electrodes) 59 and 60 are respectively arranged between the respective electrodes 52 and 53 and the ion exchange membrane 55, whereby a fuel battery cell 51 constituted by a five-layer laminated body made by arranging the electrode 52, the electrode 59, the ion exchange membrane 55, the electrode 60 and the electrode 53 in this order is formed.

A pair of electrodes 52 and 53 respectively correspond to the collector electrodes (the separators) mentioned above, are formed by the carbon plate, with a thickness of about 1 to 2 mm at actual size.

Further, the electrodes 59 and 60 respectively correspond to the membrane fixing reaction electrodes mentioned above, and are formed by the carbon so as to form a gas flow passage. A thickness of a three-layer laminated body constituted by a pair of electrodes 59 and 60 and the ion exchange membrane 55 is about 0.5 to 1.5 mm at actual size.

Gaskets (also referred as gasket lips or seal members) 61 and 62 made of a low viscosity material are integrally formed on opposing surfaces to each other of a pair of electrodes 52 and 53 so as to correspond to each other, and the ion exchange membrane 55 is held between a pair of gaskets 61 and 62 in an unbonded manner, whereby the seal portion is formed.

As shown in FIG. 10 in an enlarged manner, one gasket 62 in an upper side in the drawing among a pair of gaskets 61 and 62 is formed with a flat surface portion (also referred as a flat portion) 62b at a front end portion thereof, and the plate surface portion 62b is provided with a predetermined width w11. Further, another gasket 61 in a lower side in the drawing is formed with a front end portion 61b in a circular arc cross sectional shape, and is formed so that a width w12 of the front end portion 61b is smaller than the width w11 of the flat surface portion 62b in one gasket 62. One gasket 62 integrally has a rectangular cross sectional base portion 62c charged into a groove portion 53a, an extended portion 62e thereof and a trapezoidal cross sectional seal portion 62d integrally formed on a flat surface of the base portion 62c, and the flat surface portion 62b is formed in the seal portion 62d. A width w13 of the base portion 62c and the extended portion 62e, that is, a whole width w13 of the gasket 62 is substantially 3 to 6 mm at actual size, a width w14 of the base portion is substantially 2 to 5 mm at actual size, a width w15 of the extended portion 62e is substantially 1 mm at actual size, a width w11 of the flat surface portion 62b is substantially 1 to 4 mm at actual size, a height h11 of the base portion 62c, that is, a height h11 of the extended portion 62e is substantially 0.2 to 0.5 mm at actual size, and a height h12 of the seal portion 62d is substantially 0.1 to 0.5 mm at actual size, respectively. Another gasket 61 integrally has a rectangular cross sectional base portion 61c charged into a groove portion 52a, an extended portion 61e thereof and a chevron cross sectional seal portion 61d integrally formed on a flat surface of the base portion 61c, and the circular arc cross sectional front end portion 61b is formed in the seal portion 61d. A width w16 of the base portion 61c and the extended portion 61e, that is, a whole width w16 of the gasket 61 is substantially 3 to 6 mm at actual size, a width w17 of the extended portion 61e is substantially 1 mm at actual size, a height h13 of the base portion 61c, that is, a height h13 of the extended portion 61e is substantially 0.2 to 0.5 mm at actual size, a height h14 of the seal portion 61d is substantially 0.3 to 1.2 mm at actual size, and a radius of the circular arc of the front end portion 61b is substantially 0.1 to 0.5 mm at actual size, respectively. Both of the extended portions 61e and 62e are provided for the purpose of securing a gate port, and the extended portions 61e and 62e and expanded portions of the groove portions 52a and 53a for charging them are provided all around the periphery for reasons of a working cost, however, the structure may be of course made such that the groove portions 52a and 53a are expanded only at portions corresponding to the gate portions among all the periphery. Further, both of the gaskets 61 and 62 are respectively formed by the silicon rubber having a low hardness.

Since the gasket provided with the structure mentioned above is structured such that the gaskets 61 and 62 made of the silicon rubber corresponding to the liquid rubber hardened material are integrally formed on the surfaces of a pair of electrodes 52 and 53 corresponding to the flat surface plate porous member, and the rubber is integrally formed with the plate at the same time of forming, it is possible to realize making the seal portion thin, improving the assembling property, preventing the position shift, reducing the surface pressure and making the surface pressure uniform which are conventionally problems, and further it is possible to realize reducing a number of the parts, preventing the position shift under a pressurizing condition during a use after assembling, stabilizing a size accuracy of the product, reducing an assembling problem, preventing an malfunction unstableness due to a mis-assembling, reducing a defective molding, stably molding the gasket, improving a sealing property, simplifying a metal mold structure, reducing a molding process, reducing an adhesive treatment process, reducing a cost, reducing a cycle time, reducing a burr leakage and the like.

Further, since the flat surface portion 62b is provided in one of a pair of gaskets 61 and 62, the flat surface portion 62b forms a receiving side among a pair of seal portions by a pair of gaskets 61 and 62, and a area of the receiving side is set to be comparatively wide by the width w11 of the flat surface portion 62b. Accordingly, it is possible to enlarge an allowable range of the position shift from a medium value with respect to the closely contact position with the opposing member (the ion exchange membrane 55) of another gasket 62, whereby it is possible to sufficiently secure a necessary sealing property even when the position shift is rather great. However, in view of the improvement of the seal property, since it is preferable that the contact surface pressure with respect to the opposing member (the ion exchange membrane 55) of the gasket 62 is as large as possible, it is preferable to restrict the width w11 of the flat surface portion 62b within a range required for solving the position shift problem mentioned above.

In this case, with respect to the gasket in accordance with the fifth embodiment, it is possible to add or modify the structure in the following manner.

① A pair of upper and lower gaskets 61 and 62 in FIGS. 9 and 10 are respectively provided in the groove portions 52a and 53a formed on the surfaces of the electrodes 52 and 53. Instead of such structure, the gaskets 61 and 62 are directly provided on the surfaces of the electrodes 52 and 53, without having the groove portions 52a and 53a.

Figure 11:
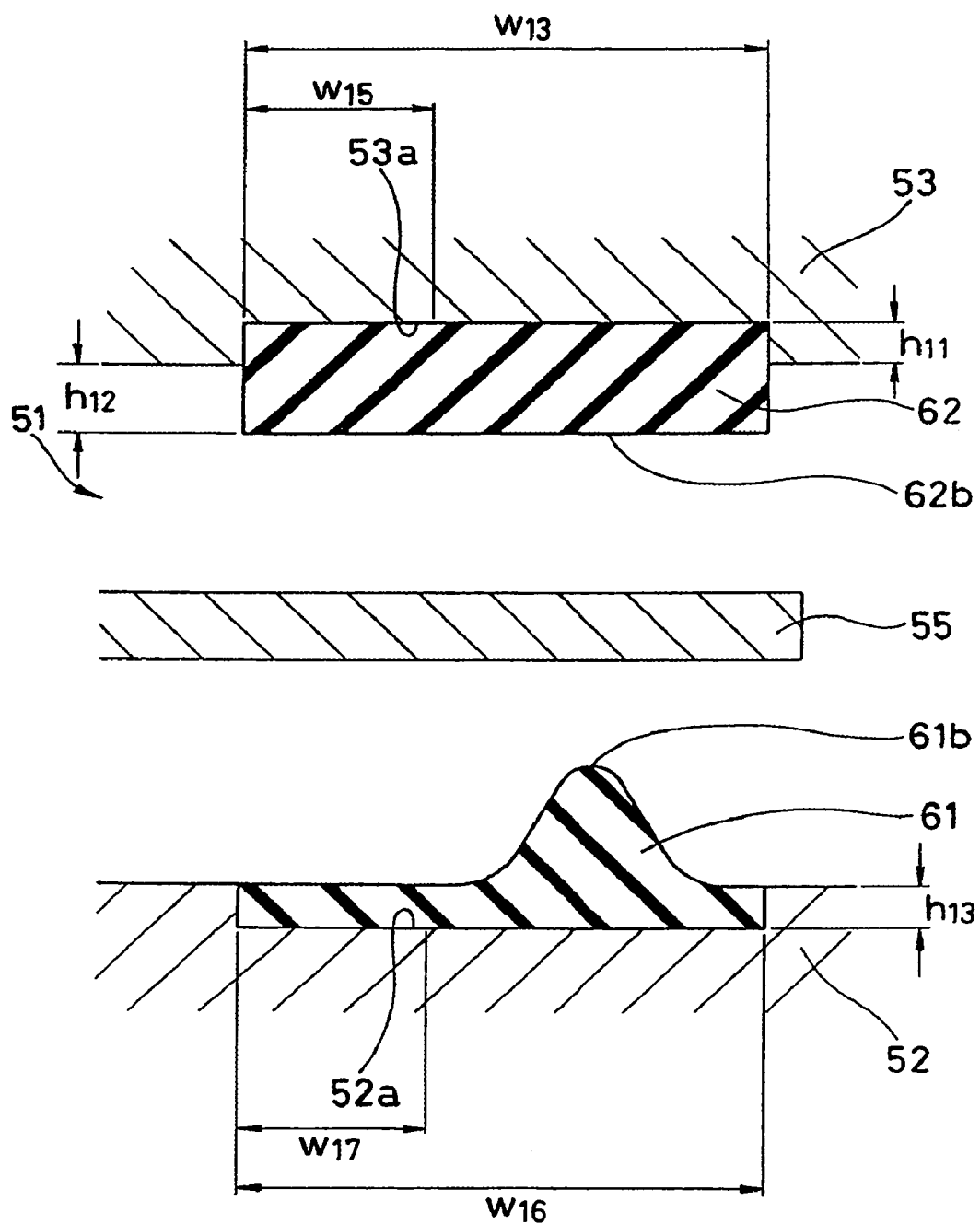
FIG. 11 is a cross sectional view of a main portion showing a modified embodiment of a structure of the gasket.

② The cross sectional shape of the seal portion of the gasket 62 provided with the flat surface portion 62b in the upper side in FIGS. 9 and 10 is a trapezoidal shape or a substantially trapezoidal shape. Instead of such structure, the cross sectional shape is made a quadrangular shape or a rectangular shape as shown in FIG. 11, and the gasket 62 is formed in a flat plate shape. In this case, the flat surface portion 62b is provided all along the width of the gasket 62.

Figure 12:
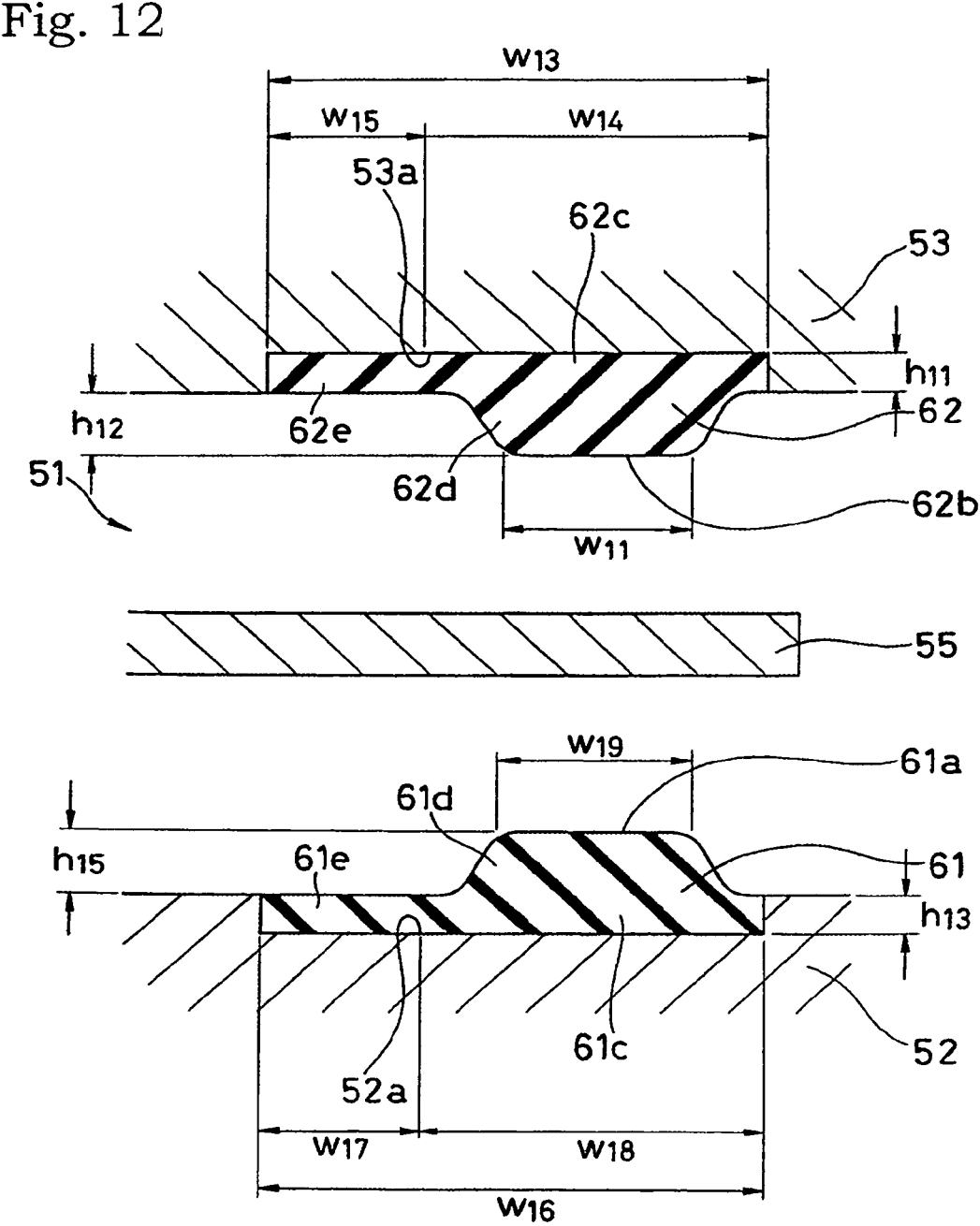
FIG. 12 is a cross sectional view of a main portion showing a modified embodiment of the structure of the gasket.

③ The cross sectional shape of the seal portion of the gasket 61 in the lower side in FIGS. 9 and 10 is a chevron shape. Instead of such structure, the cross sectional shape is made a trapezoidal shape or a substantially trapezoidal shape in the same manner as that of the upper side gasket 62 as shown in FIG. 12. Accordingly, in this case, the cross sectional shapes of both of the upper and lower gaskets 61 and 62 are respectively formed in the trapezoidal shape or substantially trapezoidal shape, and the flat surface portions 61a and 61b are respectively provided in both of the gaskets 61 and 62. Here, in this case, another gasket 61 integrally has a rectangular cross sectional base portion 61c charged into the groove portion 52a, an extended portion 61e thereof, and a trapezoidal cross sectional seal portion 61d integrally formed on a flat surface of the base portion 61c, and a flat surface portion 61b is formed in the seal portion 61d. A width w18 of the base portion 61c is substantially 2 to 5 mm at actual size, a width w19 of the flat surface portion 61a is substantially 1 to 4 mm at actual size, and a height h15 of the seal portion 61d is substantially 0.1 to 0.5 mm at actual size, respectively. The cross sectional shape may be a quadrangular shape or a rectangular shape.

Further, the contents of modification on the basis of the items ② and ③ can be applied to the third and fourth embodiments mentioned above in which the electrolyte membrane portion 54 is held between a pair of gaskets 61 and 62, as it is.

SIXTH EMBODIMENT

Figure 13:
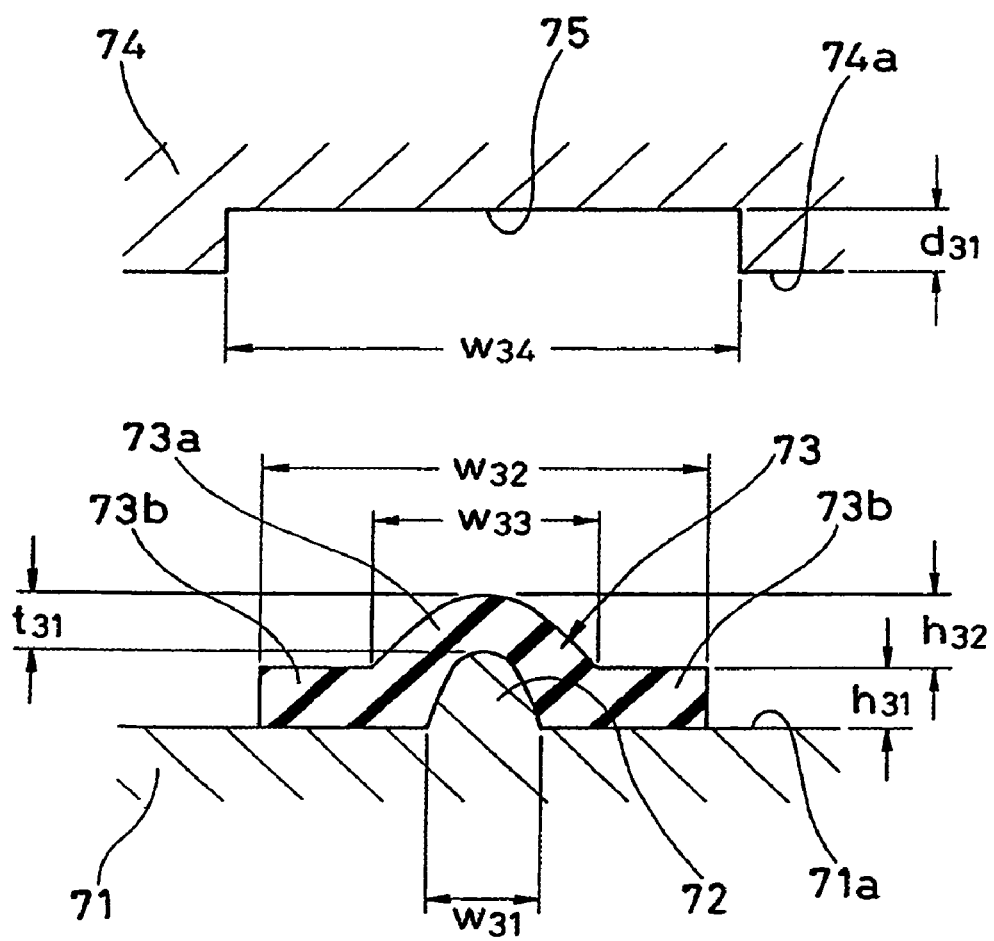
FIG. 13 is a cross sectional view of a main portion of a gasket in accordance with a sixth embodiment of the present invention.

That is, at first, as shown in FIG. 13, a projection 72 is integrally formed on a surface of a flat surface plate 71 corresponding to a collector electrode (a separator), an ion exchange membrane, a membrane fixing reaction electrode or the like made of a carbon, a graphite, a conductive resin such as a conductive phenol or the like, an ion exchange resin, or a metal such as a stainless steel, a magnesium alloy or the like, along a gasket line (also referred as a gasket lip line), as shown in FIG. 13, and a gasket 73 made of a liquid rubber hardened material having a hardness (JIS A) 60 or less, preferably 5 to 50, and more preferably 10 to 40 is integrally formed so as to cover the projection 72 without using an adhesive agent or with using the adhesive agent.

The projection 72 is formed in a substantially triangular cross sectional shape or a substantially trapezoidal cross sectional shape, and is provided all along the length of the gasket line. The gasket 73 has a substantially triangular cross sectional or substantially circular arc cross sectional chevron portion 73a which covers the projection 72 and is in contact with an opposing member 74 at a time of assembling so as to achieve a seal operation, and flat bottom portions 73b having a lower height than that of the chevron portion 73a are integrally formed in both sides of the chevron portion 73a, respectively. Further, sizes of the respective portions are set on the basis of the following standards.

Width (maximum width in bottom line portion) w31 of the projection 72: 2 mm or less Total width w32 of the gasket 73: 2 to 5 mm Width w33 of the chevron portion 73a of the gasket 73: 1 to 5 mm Height h31 of the bottom portion 73b of the gasket 73: 1 mm or less Height h32 from the upper surface of the bottom portion 73b t the top point of the chevron portion 73b: 1 mm or less Thickness t31 of the chevron portion 73a (minimum width in a center in a width direction of the chevron portion): 1 mm or less Width w34 of the recess portion 75 formed in the opposing member 74 with which the gasket is brought into contact at a time of assembling: a size equal to or more than the total width w32 of the gasket Depth d31 of the recess portion 75: 1 mm or less Further, the size of the respective portions are set as specific value under calculating so that an interval in a vertical direction between the projection 72 and the opposing member 74 at a time of assembling becomes between 0.2 and 1.0 mm and the gasket 73 having the thickness of 1.0 mm or less fills the gap on the basis of the interval so as to be compressed and serve a seal operation.

In the gasket provided with the structure mentioned above, since the gasket 73 made of a liquid rubber hardened material having a hardness (JIS A) 60 or less is integrally formed on a surface of a flat surface plate 71 corresponding to a collector electrode (a separator), an ion exchange membrane, a membrane fixing reaction electrode or the like made of a carbon, a graphite, a conductive resin such as a conductive phenol or the like, an ion exchange resin, or a metal such as a stainless steel, a magnesium alloy or the like, without using an adhesive agent or with using the adhesive agent, it is possible to realize making the seal portion thin, improving the assembling property, preventing the position shift, reducing the surface pressure and making the surface pressure uniform, which are conventionally problems, and further it is possible to realize reducing a number of the parts, preventing the position shift under a pressurizing condition during a use after assembling, stabilizing a size accuracy of the product, reducing an assembling problem, preventing an malfunction unstableness due to a mis-assembling, reducing a defective molding, stably molding the gasket, improving a sealing property, simplifying a metal mold structure, reducing a molding process, reducing an adhesive treatment process, reducing a cost, reducing a cycle time, reducing a burr leakage and the like.

Further, the projection 72 is integrally formed on the surface of the flat surface plate 71 corresponding to a collector electrode (a separator), an ion exchange membrane, a membrane fixing reaction electrode or the like made of a carbon, a graphite, a conductive resin such as a conductive phenol or the like, an ion exchange resin, or a metal such as a stainless steel, a magnesium alloy or the like, along a gasket line, and the gasket 73 made of a liquid rubber hardened material having a hardness (JIS A) 60 or less is integrally formed so as to cover the projection 72 without using an adhesive agent or with using the adhesive agent, the projection 72 supports the gasket 73, thereby further effectively preventing the position shift of the gasket 73. Further, an amount of compression of the gasket 73 is limited, whereby it is possible to sufficiently secure a seal surface pressure with a low strain amount, and the projection 72 is provided instead of having the groove portion for preventing the lateral shift, whereby it is possible to improve a durability of the gasket. Further, in the case that the structure is made such as to support the gasket 73 only by the support of the projection without using the adhesive agent, it is possible to use the gasket with a safe conscience without taking into consideration a bad influence to the power generating efficiency by the use of the adhesive agent.

In this case, with respect to the gasket in accordance with the sixth embodiment, it is possible to add or modify the structure in the following manner.

Figure 14:
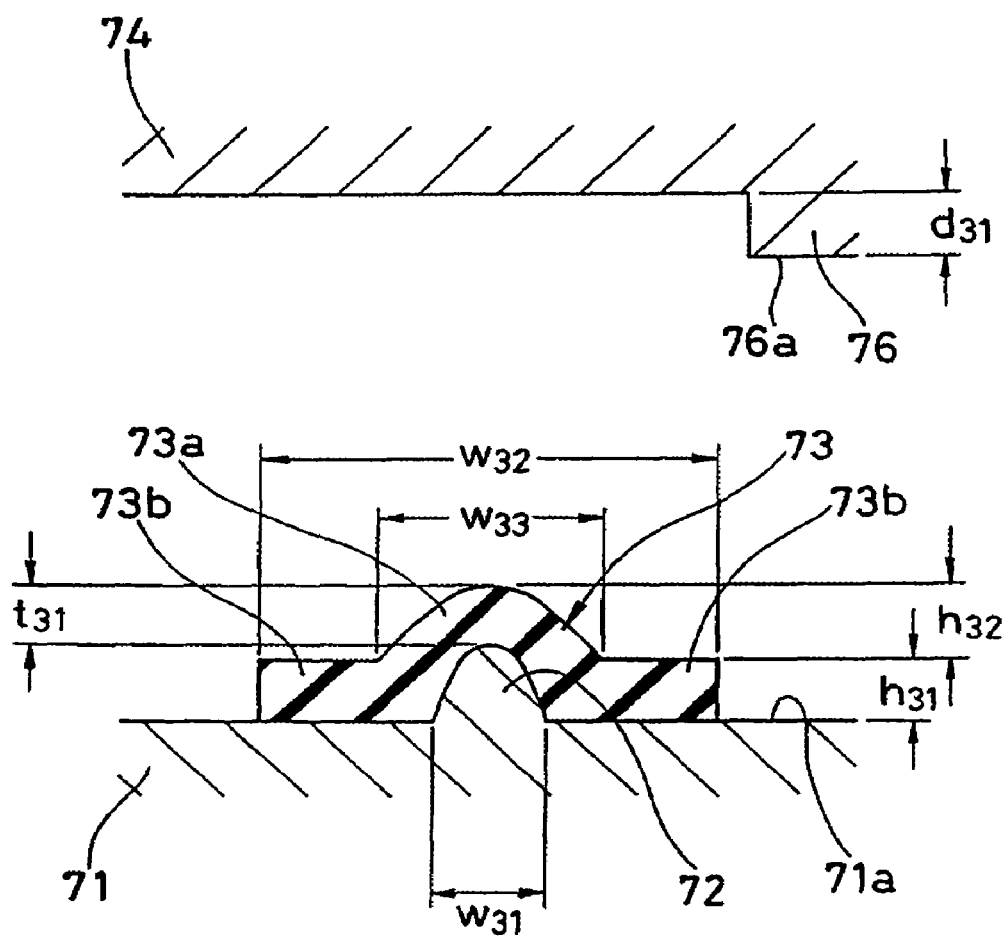
FIG. 14 is a cross sectional view of a main portion showing a modified embodiment of a structure of the gasket.
Figure 15:
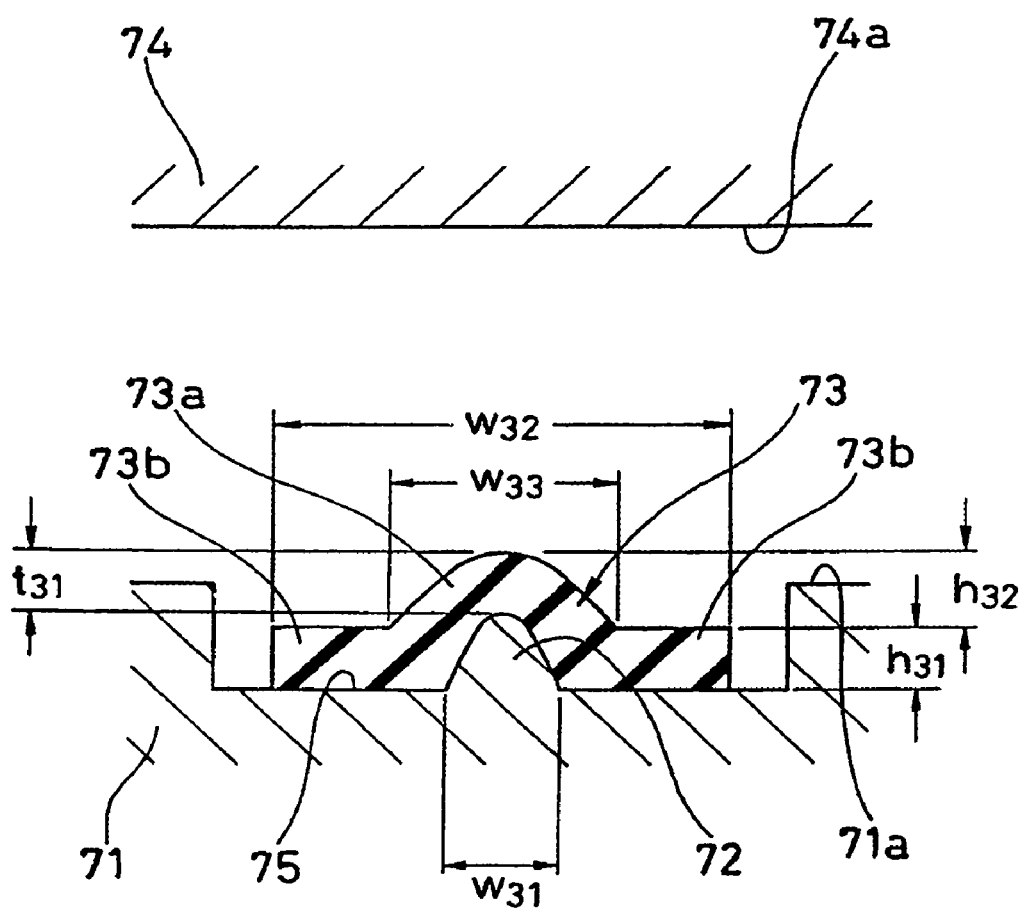
FIG. 15 is a cross sectional view of a main portion showing a modified embodiment of the structure of the gasket.
Figure 16:
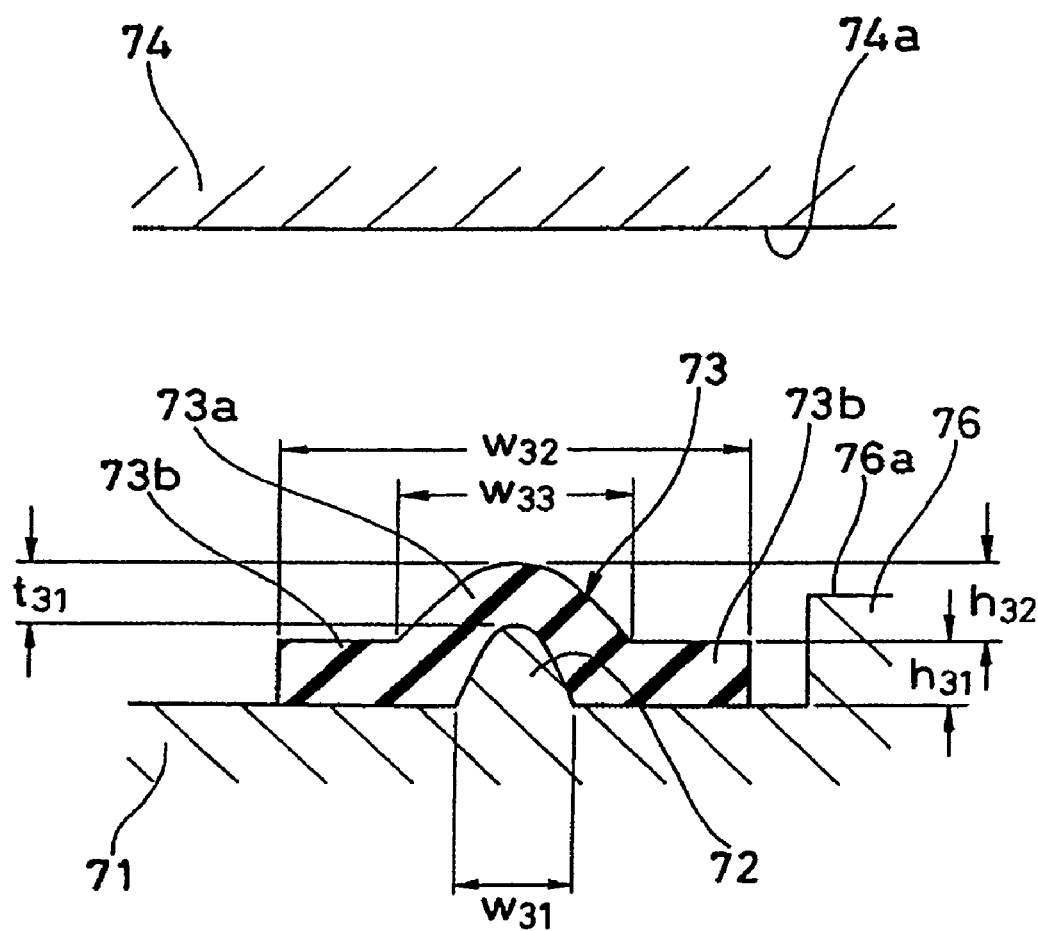
FIG. 16 is a cross sectional view of a main portion showing a modified embodiment of the structure of the gasket.

That is, in the gasket in accordance with the embodiment mentioned above, the recess portion 75 is formed in the opposing member 74 with which the gasket 73 is brought into contact at a time of assembling, because the interval equal to or more than 0.2 mm is set between the projection 72 and the opposing member 74 so as to restrict the amount of compression of the gasket 73 at a time when the surfaces 71a and 74a of the opposing member 74 and the flat surface plate 71 are in contact with each other so as to be positioned with each other. Accordingly, in place that the recess portion 75 is provided in the opposing member 74 as the means for restricting the amount of compression, the structure may be made such that a protruding or step-like spacer portion 76 is provided in the opposing member 74 as shown in FIG. 14, and a surface 76a of the spacer portion 76 is in contact with the surface 71a of the flat surface plate 71. Further, as shown in FIG. 15, the recess portion 75 may be provided in a side of the flat surface plate 71, or as shown in FIG. 16, the protruding or step-like spacer portion 76 may be provided in a side of the flat surface plate 71.

SEVENTH EMBODIMENT

Figure 17:
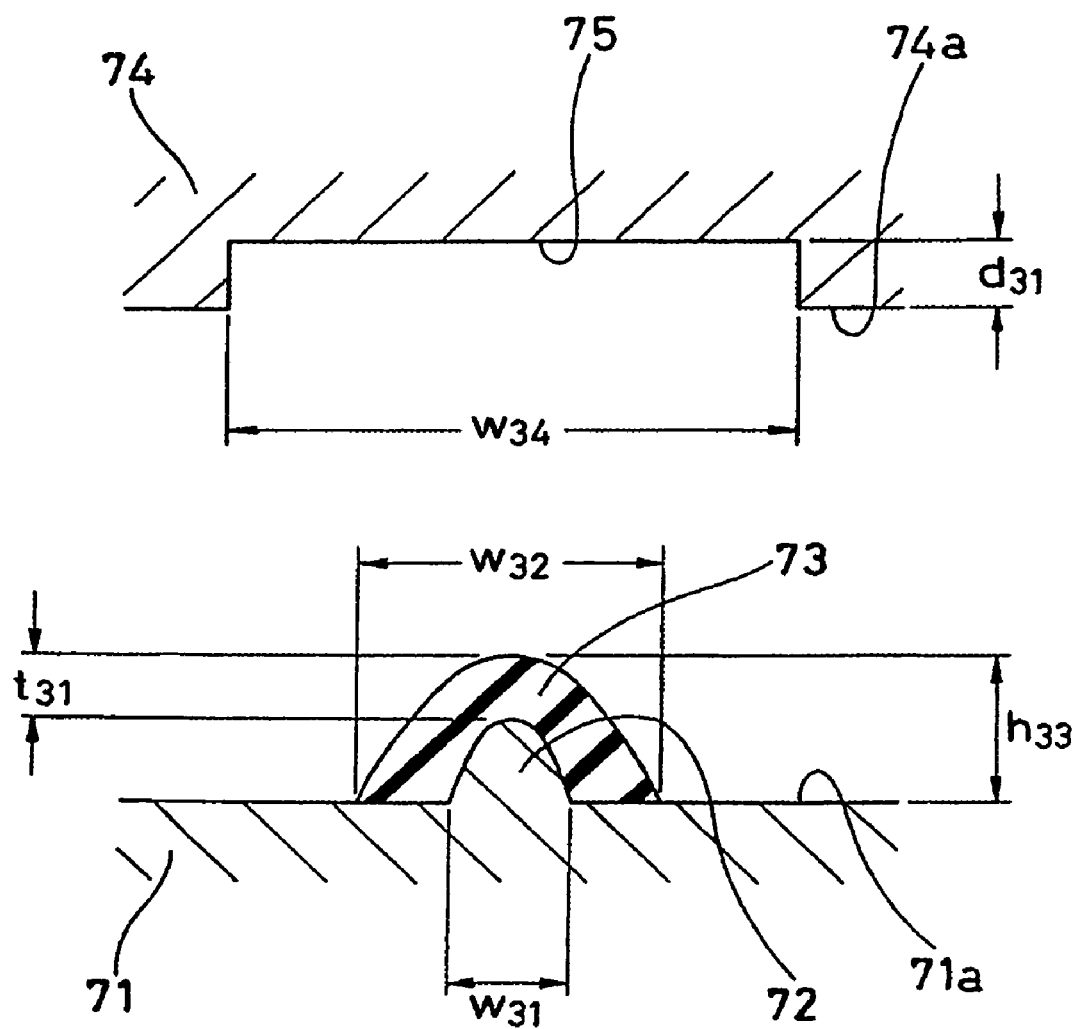
FIG. 17 is a cross sectional view of a main portion of a gasket in accordance with a seventh embodiment of the present invention.

Next, FIG. 17 shows a cross section of a gasket for a fuel battery in accordance with a seventh embodiment of the present invention, and the gasket is structured as follows.

That is, at first, a projection 72 is integrally formed on a surface of a flat surface plate 71 corresponding to a collector electrode (a separator), an ion exchange membrane, a membrane fixing reaction electrode or the like made of a carbon, a graphite, a conductive resin such as a conductive phenol or the like, an ion exchange resin, or a metal such as a stainless steel, a magnesium alloy or the like, along a gasket line (also referred as a gasket lip line), and a gasket 73 made of a liquid rubber hardened material having a hardness (JIS A) 60 or less is integrally formed so as to cover the projection 72 without using an adhesive agent or with using the adhesive agent.

The projection 72 is formed in a substantially triangular cross sectional shape or a substantially trapezoidal cross sectional shape, and is provided all along the length of the gasket line. The gasket 73 is formed in a substantially triangular cross sectional shape or a substantially circular arc cross sectional shape in such a manner as to cover the projection 72 and be in contact with an opposing member 74 at a time of assembling so as to achieve a seal operation, and the bottom portions 73b in the sixth embodiment mentioned above is not provided. Further, sizes of the respective portions are set on the basis of the following standards.

Width (maximum width in bottom line portion) w31 of the projection 72: 2 mm or less Total width w32 of the gasket 73: 2 to 5 mm Total height h33 of the gasket 73: 2 mm or less Thickness t31 of the gasket 73 (minimum width in a center in a width direction of the chevron portion) 1 mm or less Width w34 of the recess portion 75 formed in the opposing member 74 with which the gasket is brought into contact at a time of assembling: a size equal to or more than the total width w32 of the gasket Depth d31 of the recess portion 75: 1 mm or less Further, the size of the respective portions are set as specific value under calculating so that an interval in a vertical direction between the projection 72 and the opposing member 74 at a time of assembling becomes between 0.2 and 1.0 mm and the gasket 73 having the thickness of 1.0 mm or less fills the gap on the basis of the interval so as to be compressed and serve a seal operation.

In the gasket provided with the structure mentioned above, since the gasket 73 made of a liquid rubber hardened material having a hardness (JIS A) 60 or less is integrally formed on a surface of a flat surface plate 71 corresponding to a collector electrode (a separator), an ion exchange membrane, a membrane fixing reaction electrode or the like made of a carbon, a graphite, a conductive resin such as a conductive phenol or the like, an ion exchange resin, or a metal such as a stainless steel, a magnesium alloy or the like, without using an adhesive agent or with using the adhesive agent, it is possible to realize making the seal portion thin, improving the assembling property, preventing the position shift, reducing the surface pressure and making the surface pressure uniform, which are conventionally problems, and further it is possible to realize reducing a number of the parts, preventing the position shift under a pressurizing condition during a use after assembling, stabilizing a size accuracy of the product, reducing an assembling problem, preventing an malfunction unstableness due to a mis-assembling, reducing a defective molding, stably molding the gasket, improving a sealing property, simplifying a metal mold structure, reducing a molding process, reducing an adhesive treatment process, reducing a cost, reducing a cycle time, reducing a burr leakage and the like.

Further, the projection 72 is integrally formed on the surface of the flat surface plate 71 corresponding to a collector electrode (a separator), an ion exchange membrane, a membrane fixing reaction electrode or the like made of a carbon, a graphite, a conductive resin such as a conductive phenol or the like, an ion exchange resin, or a metal such as a stainless steel, a magnesium alloy or the like, along a gasket line, and the gasket 73 made of a liquid rubber hardened material having a hardness (JIS A) 60 or less is integrally formed so as to cover the projection 72 without using an adhesive agent or with using the adhesive agent, the projection 72 supports the gasket 73, thereby further effectively preventing the position shift of the gasket 73. Further, an amount of compression of the gasket 73 is limited, whereby it is possible to sufficiently secure a seal surface pressure with a low strain amount, and the projection 72 is provided instead of having the groove portion for preventing the lateral shift, whereby it is possible to improve a durability of the gasket. Further, in the case that the structure is made such as to support the gasket 73 only by the support of the projection without using the adhesive agent, it is possible to use the gasket with a safe conscience without taking into consideration a bad influence to the power generating efficiency by the use of the adhesive agent. Further, since the bottom portion is not provided in the gasket 73 and the gasket 73 is formed only in the substantially triangular cross sectional chevron portion or the substantially circular arc cross sectional chevron portion, it is possible to improve a yield ratio of the molding material and it is possible to reduce a mounting space.

In this case, with respect to the gasket in accordance with the seventh embodiment, it is possible to add or modify the structure in the following manner.

Figure 18:
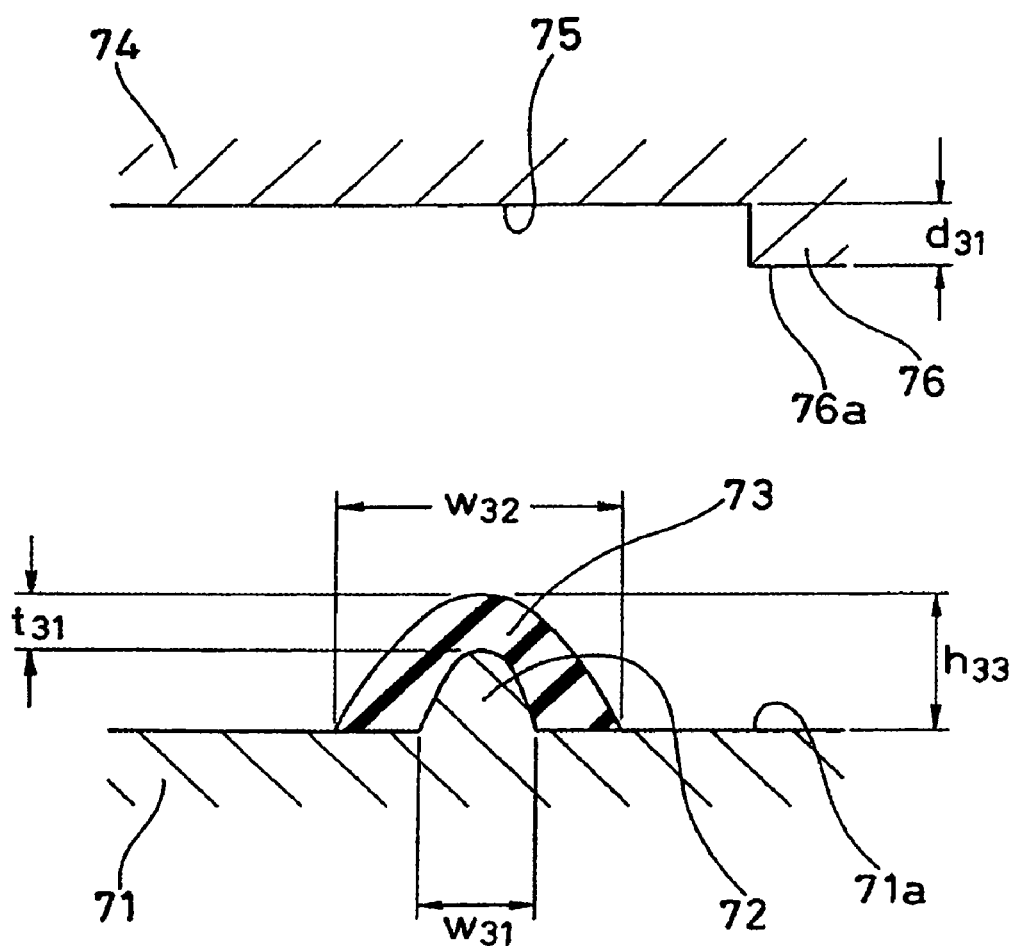
FIG. 18 is a cross sectional view of a main portion showing a modified embodiment of a structure of the gasket.
Figure 19:
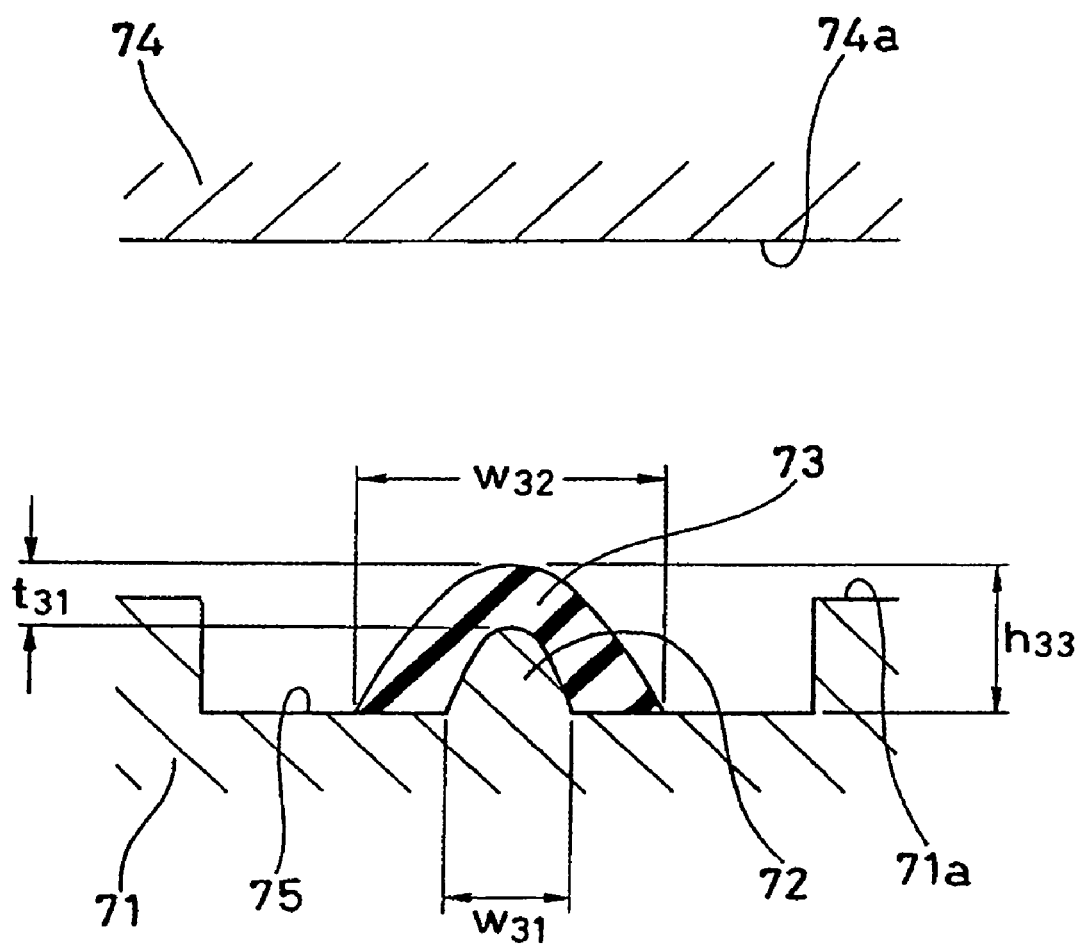
FIG. 19 is a cross sectional view of a main portion showing a modified embodiment of the structure of the gasket.
Figure 20:
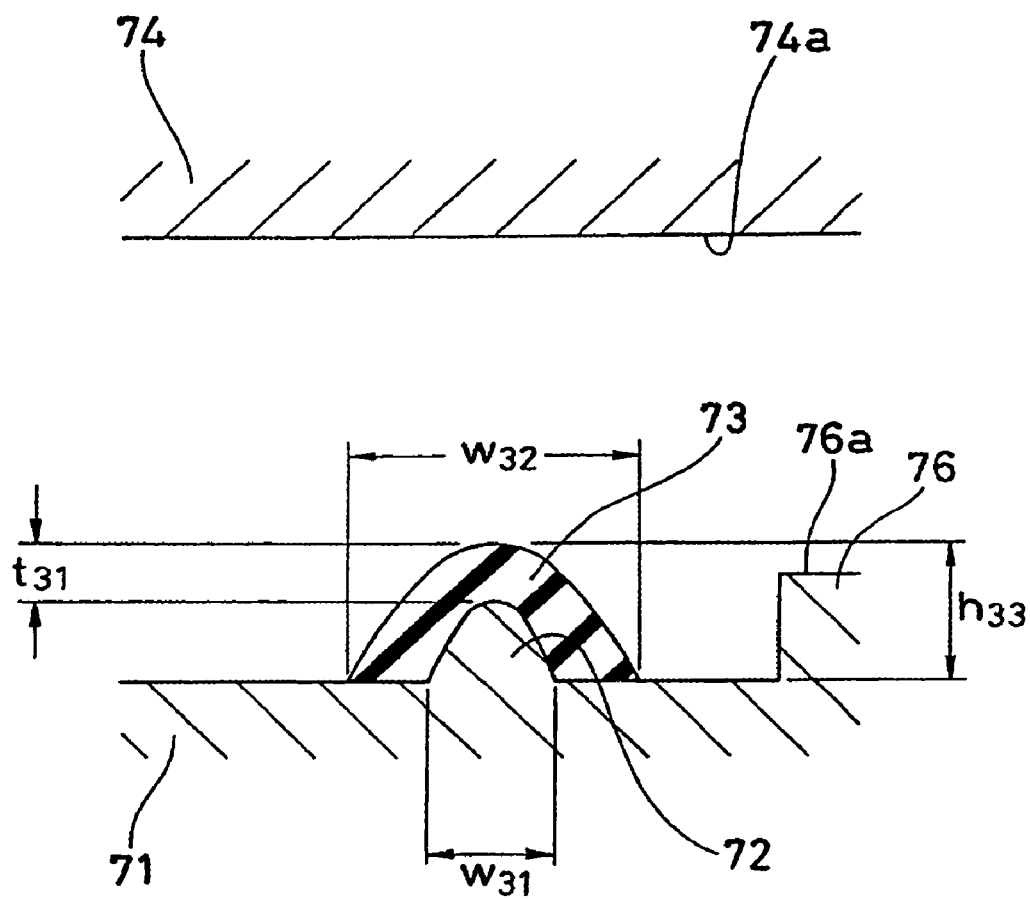
FIG. 20 is a cross sectional view of a main portion showing a modified embodiment of the structure of the gasket.

That is, in the gasket in accordance with the embodiment mentioned above, the recess portion 75 is formed in the opposing member 74 with which the gasket 73 is brought into contact at a time of assembling, because the interval equal to or more than 0.2 mm is set between the projection 72 and the opposing member 74 so as to restrict the amount of compression of the gasket 73 at a time when the surfaces 71a and 74a of the opposing member 74 and the flat surface plate 71 are in contact with each other so as to be positioned with each other. Accordingly, in place that the recess portion 75 is provided in the opposing member 74 as the means for restricting the amount of compression, the structure may be made such that a protruding or step-like spacer portion 76 is provided in the opposing member 74 as shown in FIG. 18, and a surface 76a of the spacer portion 76 is in contact with the surface 71a of the flat surface plate 71. Further, as shown in FIG. 19, the recess portion 75 may be provided in a side of the flat surface plate 71, or as shown in FIG. 20, the protruding or step-like spacer portion 76 may be provided in a side of the flat surface plate 71.

EIGHTH EMBODIMENT

Further, in connection with the technique that the rubbers are mounted on both surfaces of the plate via the through hole provided in the plate described in the second embodiment (FIGS. 4 and 5), the applicant of the present invention further provides the following technique.

This technique relates to the sixteenth aspect and the seventeenth aspect of the present invention, and its main technical object is to provide a method of manufacturing a both surface lip gasket in which a crack and a permanent deformation of a substrate due to a molding pressure are hard to be generated at a time of molding seal lips on both surfaces, even in the case that the substrate is made of a brittle material or a material having a low strength, a low extension and a low elasticity. As a means for effectively achieving the technical object, in the method of manufacturing the both surface lip gasket in which the seal lips made of an elastomer are integrally formed on both surfaces of the substrate, a communication hole communicating between seal lip forming cavities formed between metal molds engaged and aligned with both surfaces is provided in the substrate, the communication hole is disposed at a position corresponding to a gate open to one of both seal lip forming cavities and formed so as to have a larger diameter than that of the gate, and a molding material supplied from the gate is injected to the both seal lip forming cavities via the communication hole.

Further, in accordance with this method, the molding material supplied from the gate is injected into the seal lip forming cavities in both sides via the communication hole provided in the substrate at the position immediately under the gate. At this time, since the communication hole has a larger diameter than an opening diameter of the gate, a molding pressure does not start up first in the forming cavity in the side to which the gate is open, whereby it is possible to effectively prevent a pressure difference from being generated between both of the cavities. One or more gates are provided depend on the shape of the gasket.

As the substrate of the both surface lip gasket, in addition to the brittle material such as a molding carbon, for example, there can be listed up a porous material of a plastic, a ceramic or a metal corresponding to a low strength material, a thermosetting material such as a ceramic, a phenol resin or the like and a thermoplastic engineering plastic corresponding to a low extension material, and a thermoplastic elastomer corresponding to a low elasticity material.

This technique can be widely applied to a forming technique of both surface lip gasket integrally having lip gaskets made of an elastomer on both surfaces of a thin substrate, such as a gasket for a circuit substrate, a gasket for a hard disc, a gasket for a fuel battery cell, and the like.

A description will be given below of a preferable embodiment of this method with reference to the accompanying drawings.

Figure 21:
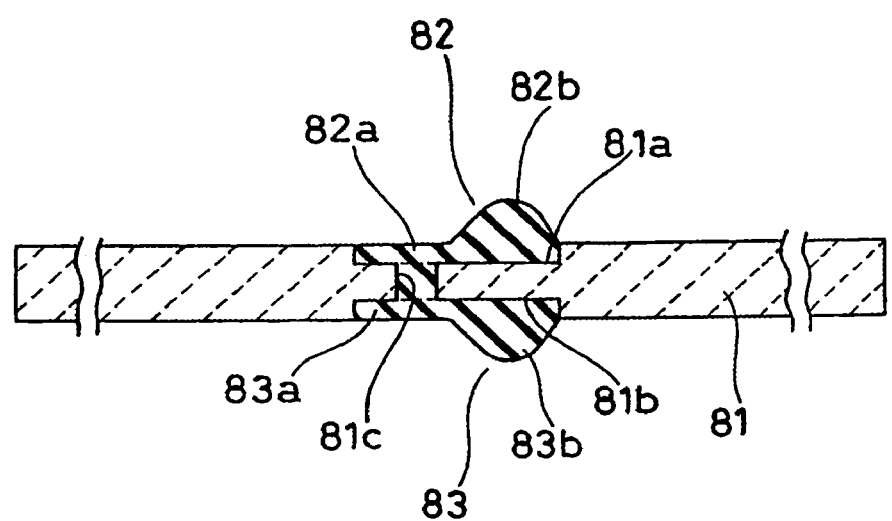
FIG. 21 is a schematic cross sectional view of a bipolar plate for a fuel battery provided with a gasket formed by a manufacturing method in accordance with an eighth embodiment of the present invention.

At first, both surface lip gasket shown in FIG. 21 is structured such that seal lips 82 and 83 made of an elastomer material, for example, a silicon rubber or the like are integrally formed on both surfaces of a bipolar plate 81 for a fuel battery in accordance with the method of the present invention.

In particular, the bipolar plate 81 is molded in a plate shape with a molding carbon of gas-proof compact bone, band-like grooves 81a and 81b are respectively formed in gasket attaching portions on both surfaces, and a communication hole 81c corresponding to a through hole passing through a portion between the groove bottoms is formed with a predetermined interval in a longitudinal direction of the band-like grooves 81a and 81b. Further, base portions 82a and 83a of the seal lips 82 and 83 are formed so as to fill up the band-like grooves 81a and 81b, and are connected to each other via a portion extending within the communication hole 81c, and chevron-shaped or convex lip main bodies 82b and 83b in the respective seal lips 82 and 83 are formed at positions shifted to one side in a width direction of the band-like grooves 81a and 81b from the communication hole 81c.

The fuel battery, as is well known, has a structure in which unit cells made by respectively arranging electrode plates corresponding to a fuel pole and an air pole in both sides in a thickness direction of the electrolyte membrane (the ion exchange membrane) are laminated via the bipolar plate 81 at a multiplicity of layers. The bipolar plate 81 has a function that the chevron-like lip main bodies 82b and 83b of the seal lips 82 and 83 protruding from both surfaces of the bipolar plate 81 is brought into close contact with the electrolyte membrane side with a proper crushing margin so as to seal, thereby preventing an air (an oxygen) supplied to the air pole in another side from being mixed within a flow passage of a hydrogen gas supplied to the fuel pole, preventing the hydrogen gas from being mixed within the air flow passage, and preventing a power generation efficiency from being reduced, in addition to a function serving as an electron conductive body for connecting the respective cells in series.

Figure 22:
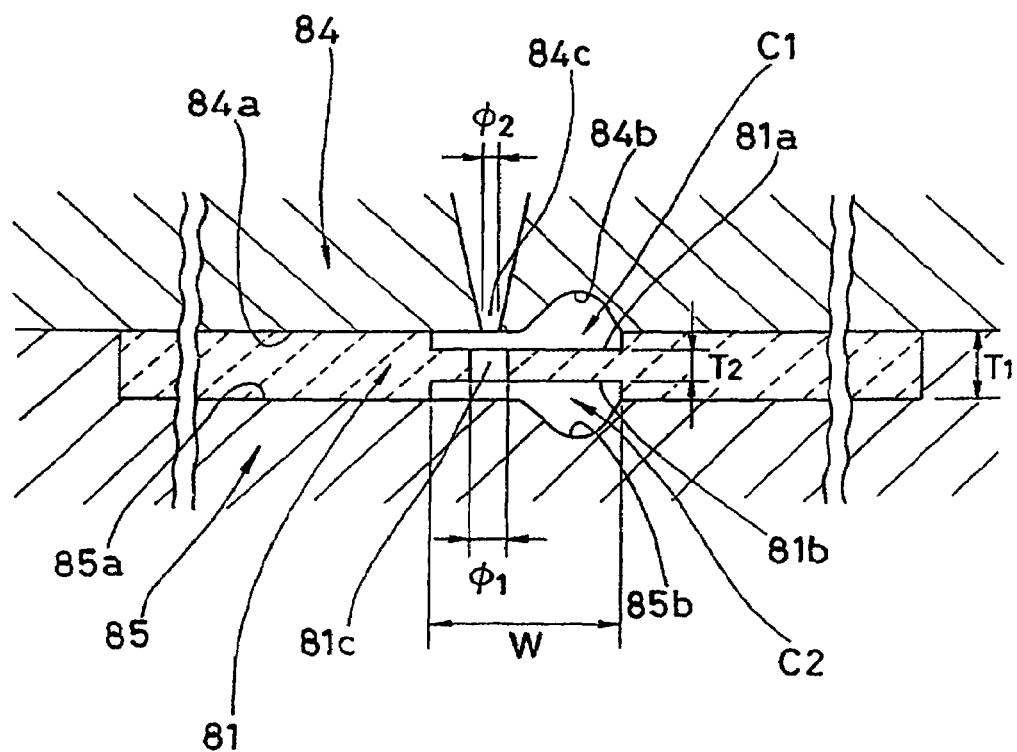
FIG. 22 is a schematic view of a metal mold structure for forming the gasket.
Figure 24:
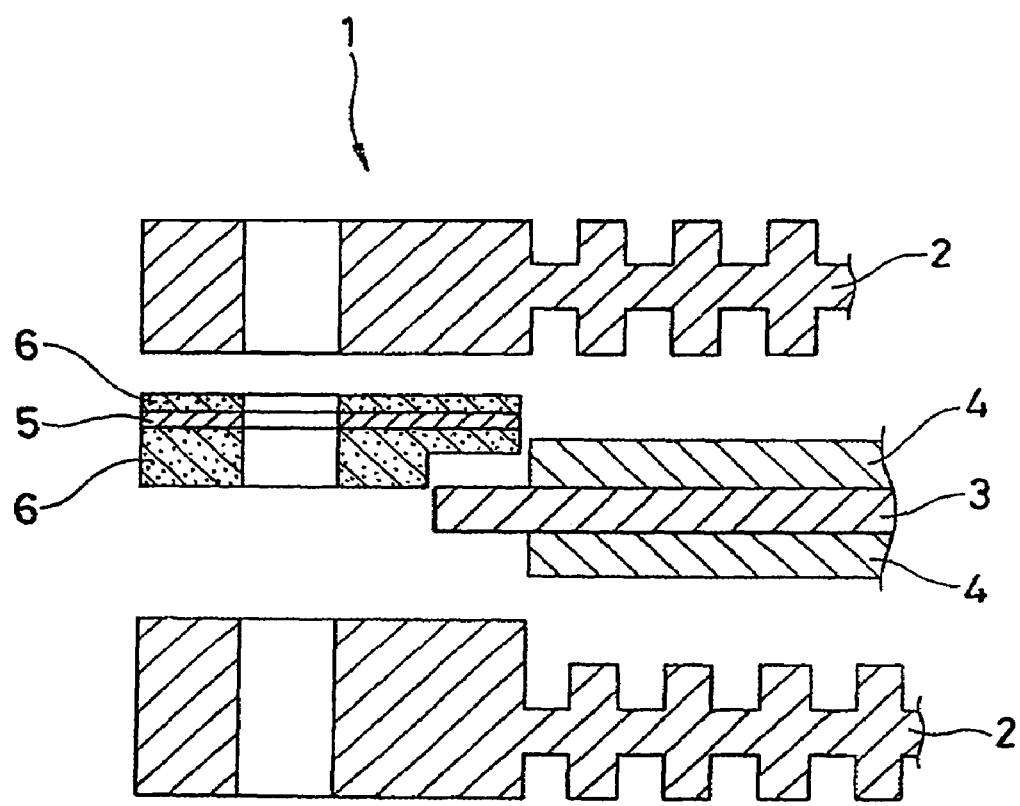
FIG. 24 is a schematic view showing an embodiment of a structure of a fuel battery.

FIG. 22 schematically shows a method of manufacturing the both surface lip gasket provided with the structure mentioned above. In FIG. 22, reference numerals 84 and 85 denote parts of an injection molding metal mold for molding the seal lips 82 and 83 on both surfaces of the bipolar plate 81. The bipolar plate 81 is held within a recess portion formed in the lower metal mold 85 in the drawing, and the structure is made such that both surfaces of the bipolar plate 81 are closely engaged and aligned with a lower surface (an aligned surface 84a) of the metal mold 84 and a recess portion bottom surface (an aligned surface 85a) of the metal mold 85 with a predetermined surface pressure, at a time of clamping the mold. In this case, the band-like grooves 81a and 81b and the communication hole 81c are previously formed in the bipolar plate 81.

Chevron grooves 84b and 85b opposing to the band-like grooves 81a and 81b formed in the bipolar plate 81 are respectively formed on the aligned surfaces 84a and 85a with the bipolar 81 in the metal molds 84 and 85. The chevron grooves 84b and 85b correspond to the chevron-like lip main bodies 82b and 83b shown in FIG. 21, have a smaller groove width than that of the band-like grooves 81a and 81b, and are formed at positions shifted to one side in a width direction of the band-like grooves 81a and 81b. Accordingly, in the illustrated mold clamping state, a seal lip forming cavity C1 is defined by the band-like groove 81a and the chevron groove 84b, and an opposite side seal lip forming cavity C2 is defined by the band-like groove 81b and the chevron groove 85b.

A gate 84c open toward the seal lip forming cavity C1 defined by clamping the mold is provided in one metal mold 84. The gate 84c constitutes a supply passage of the molding material from the molding material injection apparatus via a runner and a sprue (not shown) in the metal mold apparatus, and is open to the aligned surface 84a in correspondence to an open position of the communication hole 81c in a bottom portion of the band-like groove 81a of the bipolar plate 81. Further, an inner diameter φ1 of the communication hole 81c is about 1 mm at actual size, and the communication hole 1c is formed so as to have a larger diameter in comparison with an opening diameter φ2 of the gate 84c.

Prior to the mold clamping shown in FIG. 22, an evacuation is executed within the seal lip forming cavities C1 and C2 by a vacuum pump (not shown) or the like. Further, when injecting the liquid-phase elastomer molding material supplied from the injection molding apparatus from the gate 84c after clamping the mold, the molding material is substantially simultaneously charged into the seal lip forming cavities C1 and C2 in both sides of the bipolar plate 81 via the communication hole 81c positioned immediately below the gate 84c.

At this time, since a relation φ1>φ2 is established, a pressure reduction operation due to a fluid resistance in the communication hole 1c is not generated, so that a differential pressure is hardly generated between the seal lip forming cavities C1 and C2. Accordingly, it is possible to effectively prevent the crack due to the differential pressure between both of the cavities C1 and C2 from being generated in a thin portion between the band-like grooves 81a and 8b in the bipolar plate 81.

By using the molding carbon plate with a flexural strength 10 MPa having a shape shown in FIG. 22 (thickness T1=2 mm, width of the band-like grooves 81a and 81b W=5 mm, thickness between the band-like grooves 81a and 81b T2=1 mm), a test forming the seal lips on both surfaces is executed. In this test, while the opening diameter φ2 of the gate 84c is set to 0.5 mm, the inner diameter φ1 of the communication hole 81c in the carbon plate in accordance with the embodiment is set to 1 mm which is larger than the diameter φ2, and the inner diameter φ1 of the communication hole 81c in the carbon plate in accordance with the comparative embodiment is set to 0.3 mm which is smaller than the diameter φ2. Table in FIG. 23 shows the test results. As a result of the test mentioned above, in the structure in accordance with the embodiment, it is recognized that no crack is generated in the molding carbon plate even under the standard molding pressure of 30 MPa and a normal injection molding can be executed.

In this case, in the embodiment mentioned above, the description is given only of the case that the both surface lip gasket is provided in the bipolar plate for the fuel battery, however, the present invention can be effectively applied to the case that the both surface lip gasket is formed on a circuit substrate made of a glass epoxy resin plate, a polyimide or a polyester resin sheet and a substrate made of a material having a low strength, a low extension and a low elasticity.

Further, in the illustrated embodiment, the base portions 82a and 83a of the seal lips 82 and 83 are formed within the band-like grooves 81a and 81b, however, the present invention can be applied to a structure in which the band-like grooves 81*a* and 81*b* mentioned above are not formed.

Since the gasket described in each of the embodiments mentioned above is integrally formed on the substrate in spite that the width and the height thereof are significantly small, and even when the rubber hardness of the gasket is equal to or less than 60, preferably between 5 and 50, it is possible to accurately and quickly assemble the gasket, and it is possible automate the assembling operation due to integral forming on the substrate, it is possible to reduce the size of the fuel battery due to the reduced height, it is possible to realize the low surface pressure due to the reduced hardness, and it is possible to absorb an unevenness even when the unevenness exists on the opposing surface of the gasket.

EFFECT OF THE INVENTION AND INDUSTRIAL APPLICABILITY

The present invention has the following effects.

That is, at first, in the gasket provided with the structure mentioned above in accordance with each of the aspects of the present invention, since each of the inventions is structured on the basis of the structure that the gasket lip made of the liquid rubber hardened material is integrally formed on the surface of the flat surface plate or on the groove portion applied on the surface made of a carbon, a graphite, a conductive resin such as a conductive phenol or the like, an ion exchange resin, or a metal such as a stainless steel, a magnesium alloy or the like, it is possible to realize making the seal portion thin, improving the assembling property, preventing the position shift, reducing the surface pressure and making the surface pressure uniform, which are conventionally problems, and further it is possible to realize reducing a number of the parts, preventing the position shift under a pressurizing condition during a use after assembling, stabilizing a size accuracy of the product, reducing an assembling problem, preventing an malfunction unstableness due to a mis-assembling, reducing a defective molding, improving a sealing property, reducing a molding process, reducing an adhesive treatment process, reducing a cost, reducing a burr leakage and the like.

Further, in addition thereto, in the gasket in accordance with the thirteenth aspect of the present invention provided with the structure mentioned above, since a pair of gasket lips are formed so as to have different cross sectional shapes and the flat surface portion is provided in one gasket lip, it is possible to enlarge an allowable range of position shift from a medium value with respect to a closely contact position of another gasket lip with the opposing member, whereby it is possible to sufficiently secure a necessary sealing property even when the position shift is somewhat great.

Further, in the gasket in accordance with the fourteenth aspect or the fifteenth aspect of the present invention provided with the structure mentioned above, since the flat portion provided with the predetermined width being in contact with the electrolyte membrane portion or the ion exchange membrane is formed in at least one of a pair of gasket lips arranged so as to hold the electrolyte membrane portion or the ion exchange membrane between them, it is possible to enlarge the allowable range of position shift from the medium value with respect to the closely contact position of another gasket lip with the opposing member, whereby it is possible to sufficiently secure a necessary sealing property even when the position shift is somewhat great. Further, in the case that the flat surface portions are provided in both gasket lips, the contact state becomes stable, whereby it is possible to sufficiently secure the necessary sealing property.

Further, in the gasket in accordance with the sixteenth aspect, the seventeenth aspect or the eighteenth aspect of the present invention provided with the structure mentioned above, since the projection is provided on the surface of the flat surface plate corresponding to the collector electrode (a separator), the ion exchange membrane, the membrane fixing reaction electrode or the like made of a carbon, a graphite, a conductive resin such as a conductive phenol or the like, an ion exchange resin, or a metal such as a stainless steel, a magnesium alloy or the like along the gasket lip line, the gasket lip is integrally formed so as to cover the projection and the projection supports the gasket lip, whereby it is possible to further effectively prevent the position shift of the gasket lip. Further, since an amount of compression of the gasket lip is restricted, it is possible to sufficiently secure the seal surface pressure with the low strain amount, and since the projection is provided instead of having the groove portion for preventing the lateral shift, it is possible to improve a durability of the gasket.

Further, in the forming method of the gasket in accordance with the nineteenth aspect or the twentieth aspect of the present invention provided with the structure mentioned above, it is possible to provide the molding method which can stably mold the gasket, has a comparatively simple structure of the metal mold apparatus, and has a comparatively short cycle time.

Further, in the molding method of the gasket in accordance with the nineteenth aspect or the twentieth aspect of the present invention provided with the structure mentioned above, it is possible to realize making the seal portion thin, improving the assembling property, preventing the position shift, reducing the surface pressure and making the surface pressure uniform, which are conventionally problems, and further it is possible to realize reducing a number of the parts, preventing the position shift under a pressurizing condition during a use after assembling, stabilizing a size accuracy of the product, reducing an assembling problem, preventing an malfunction unstableness due to a mis-assembling, reducing a defective molding, stably molding the gasket, improving a sealing property, simplifying a metal mold structure, reducing a molding process, directly molding the gaskets on both surfaces of the thin plate, reducing an adhesive treatment process, reducing a cost, reducing a cycle time, preventing a plate crack, reducing a burr leakage and the like.

Further, in the gasket in accordance with the twenty first aspect of the present invention provided with the structure mentioned above and the molding method of the gasket in accordance with the twenty second aspect of the present invention, since the communication hole having a larger diameter than that of the gate is provided in the substrate so as to communicate the cavities in both sides with each other, the molding material supplied from the gate is injected into the seal lip molding cavities in both sides via the communication hole, and at this time, the pressure difference due to the reason that the molding pressure first starts up in one molding cavity is restricted to be small, it is possible to prevent the crack and the permanent deformation of the substrate due to the pressure difference from being generated, and accordingly, it is possible to effectively apply to the case of forming the both surface lip gasket on the substrate made of the brittle material or the like, for example, the bipolar plate for the fuel battery or the like.

What is claimed is:

1. A gasket for a fuel battery wherein a pair of parallel electrodes clamp an electrolyte membrane portion in between through the gasket that is secured in grooves formed in two opposing inner surfaces of the electrodes in the battery, the gasket comprises:

a first gasket lip made of a liquid rubber hardened material and adapted to be secured in a groove formed in one of said electrodes, said first gasket lip including a base portion having a rectangular shape in cross section and adapted to fit in said one groove and a first sealing portion having a given shape in cross section and projected outward from said base portion; and a second gasket lip made of a liquid rubber hardened material and adapted to be secured in a groove formed in the other electrode, said second gasket lip including a base portion having a rectangular shape in cross section and adapted to fit in the groove in the other electrode and a second sealing portion having a given shape in cross section and projected outward from said base portion;

wherein said first and second sealing portions are arranged to oppose each other in said fuel battery to clamp said electrolyte membrane portion in between; and wherein said first sealing portion has a chevron shape in cross section and said second sealing portion has a trapezoidal shape in cross section.

2. A gasket for a fuel battery wherein a pair of parallel electrodes clamp an electrolyte membrane portion in between through the gasket that is secured in grooves formed in two opposing inner surfaces of the electrodes in the battery, the gasket comprises:

a first gasket lip made of a liquid rubber hardened material and adapted to be secured in a groove formed in one of said electrodes, said first gasket lip including a base portion having a rectangular shape in cross section and adapted to fit in said one groove and a first sealing portion having a given shape in cross section and projected outward from said base portion; and a second gasket lip made of a liquid rubber hardened material and adapted to be secured in a groove formed in the other electrode, said second gasket lip including a base portion having a rectangular shape in cross section and adapted to fit in the groove in the other electrode and a second sealing portion having a given shape in cross section and projected outward from said base portion;

wherein said first and second sealing portions are arranged to oppose each other in said fuel battery to clamp said electrolyte membrane portion in between; and wherein said first and second sealing portions are provided at positions shifted from the centers in the width direction of said base portions.

3. A gasket for a fuel battery wherein a substrate adapted to fit in the fuel battery, said substrate having two opposite surfaces with a pair of grooves, each surface having one groove, said grooves being connected with each other through a connection hole in the substrate, and said gasket being secured in said grooves, said gasket comprises:

a first gasket lip made of a liquid rubber hardened material and adapted to be secured in a groove formed in one of said substrate surfaces, said first gasket lip including a base portion having a rectangular shape in cross section and adapted to fit in said one groove and a first sealing portion having a given shape in cross section and projected outward from said base portion; and a second gasket lip made of a liquid rubber hardened material and adapted to be secured in a groove formed in the other substrate surface, said second gasket lip including a base portion having a rectangular shape in cross section and adapted to fit in the groove in the other substrate surface and a second sealing portion having a given shape in cross section and projected outward from said base portion; and a coupling portion adapted to be secured in said connection hole in said substrate for interconnecting said first and second gasket lips, said coupling portion being made of the same material as those of said first and second gasket lips;

wherein said first and second sealing portions are provided at positions shifted from the centers in the width direction of said base portions; and wherein the connecting hole is provided at a position corresponding to a material injection gate in a mold and a diameter of said connection hole is larger than a diameter of the material injection gate.

4. A method of forming a gasket for a fuel battery, comprising the steps of:

forming a groove in each of two opposing inner surfaces of a pair of electrodes to be arranged parallel to each other in a fuel battery;

disposing one of said pair of electrodes in a first mold;

forming a first gasket lip by injecting a liquid rubber hardened material into the groove in one of said electrodes;

forming on said first gasket lip a base portion having a rectangular shape in cross section and adapted to fit in the groove in said one electrode and a first sealing portion having a given shape in cross section and projected outward from said base portion;

disposing the other of said pair of electrodes in a second mold;

forming a second gasket lip by injecting a liquid rubber hardened material into the groove in the other electrodes;

forming on said second gasket lip a base portion having a rectangular shape in cross section and adapted to fit in the groove in the other electrode and a second sealing portion having a given shape in cross section and projected outward from said base portion; and providing gaps in said first and second molds before injecting so as to evacuate and thereafter clamping said molds so as to injection-mold said first and second gasket lips;

wherein said first sealing portion has a chevron shape in cross section and said second sealing portion has a trapezoidal shape in cross section.

5. A method of forming a gasket for a fuel battery, comprising the steps of:

forming a groove in each of two opposing inner surfaces of a pair of electrodes to be arranged parallel to each other in a fuel battery;

disposing one of said pair of electrodes in a first mold;

forming a first gasket lip by injecting a liquid rubber hardened material into the groove in one of said electrodes;

forming on said first gasket lip a base portion having a rectangular shape in cross section and adapted to fit in the groove in said one electrode and a first sealing portion having a given shape in cross section and projected outward from said base portion;

disposing the other of said pair of electrodes in a second mold;

forming a second gasket lip by injecting a liquid rubber hardened material into the groove in the other electrodes;

forming on said second gasket lip a base portion having a rectangular shape in cross section and adapted to fit in the groove in the other electrode and a second sealing portion having a given shape in cross section and projected outward from said base portion; and providing gaps in said first and second molds before injecting so as to evacuate and thereafter clamping said molds so as to injection-mold said first and second gasket lips;

wherein said connection hole, said first and second portions are provided at positions shifted from the centers in the width direction of said base portions; and wherein the connecting hole is provided at a position corresponding to a material injection gate in a mold and a diameter of said connection hole is larger than a diameter of the material injection gate.

6. A method of forming a gasket for a fuel battery, comprising the steps of:

forming a groove in one of two opposing inner surfaces of a pair of electrodes to be arranged parallel to each other in a fuel battery;

forming a projection on a bottom portion of said groove;

disposing one of said pair of electrodes with the groove in a first mold;

forming a gasket lip by injecting a liquid rubber hardened material into the groove in one of said electrodes to cover the projection;

wherein the projection is in a substantially triangular cross sectional shape or a substantially trapezoidal cross sectional shape and the gasket lip has a substantially triangular or circular arc cross sectional chevron portion which covers the projection; and wherein the vertical height of the projection and the gasket lip thereon from the bottom portion of the groove is greater than the depth of the groove, so that the gasket lip is in contact with the opposing inner surface of one of the pair of electrodes when assembled to achieve a sealing function.

7. A method of forming a gasket for a fuel battery, comprising the steps of:

forming a groove on each of two opposite surfaces of a substrate adapted to fit in a fuel battery;

forming a connection hole in said substrate between said grooves to connect said grooves with each other;

disposing said substrate in a mold;

forming a first gasket lip, a second gasket lip, and a coupling portion by injecting a liquid rubber hardened material into said grooves and connection hole in said substrate;

forming on said first gasket lip a base portion having a rectangular shape in cross section and adapted to fit in the grooves in the one surface of said substrate and a first sealing portion having a given shape in cross section and projected outward from said base portion;

forming on said second gasket lip a base portion having a rectangular shape in cross section and adapted to fit in the groove in the other surface of said substrate and a second sealing portion having a given shape in cross section and projected outward from said base portion; and providing a gap in said mold before injecting so as to evacuate and thereafter clamping said mold so as to injection-mold said first and second gasket lips;

wherein said first and second sealing portions are provided at positions shifted from the centers in the width direction of said base portions; and wherein said connection hole is provided at a position corresponding to a material injection gate in said mold and a diameter of said connection hole is set to be larger than a diameter of said material injection gate.

* * * * *